(12) United States Patent
Poulin

(10) Patent No.: US 11,002,165 B2
(45) Date of Patent: May 11, 2021

(54) MUFFLER FOR AN INTERNAL COMBUSTION ENGINE

(71) Applicant: BOMBARDIER RECREATIONAL PRODUCTS INC., Valcourt (CA)

(72) Inventor: Etienne Poulin, St-Denis-de-Brompton (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/500,756

(22) PCT Filed: Jul. 21, 2017

(86) PCT No.: PCT/IB2017/054445
§ 371 (c)(1),
(2) Date: Oct. 3, 2019

(87) PCT Pub. No.: WO2018/185538
PCT Pub. Date: Oct. 11, 2018

(65) Prior Publication Data
US 2020/0102865 A1  Apr. 2, 2020

Related U.S. Application Data

(60) Provisional application No. 62/481,407, filed on Apr. 4, 2017.

(51) Int. Cl.
*F01N 1/02* (2006.01)
*F01N 13/00* (2010.01)

(52) U.S. Cl.
CPC ........... *F01N 1/023* (2013.01); *F01N 13/007* (2013.01); *F01N 2410/00* (2013.01); *F01N 2470/02* (2013.01); *F01N 2490/155* (2013.01)

(58) Field of Classification Search
CPC ...... F01N 1/023; F01N 2410/00; F01N 1/161; F01N 1/163; F01N 1/165; F01N 1/166;
(Continued)

(56) References Cited

U.S. PATENT DOCUMENTS 3,583,524 A * 6/1971 Dubois ................... F01N 13/04
181/266
3,765,506 A   10/1973 Strunk
(Continued)

FOREIGN PATENT DOCUMENTS

CN   201461034 U   5/2010
CN   104564237 A   4/2015
(Continued)

OTHER PUBLICATIONS

Search Report dated Jan. 20, 2020 by the Chinese Patent Office in connection with the corresponding application No. 201780089244.3.

(Continued)

*Primary Examiner* — Jeremy A Luks
(74) *Attorney, Agent, or Firm* — BCF LLP

(57) ABSTRACT

A muffler has a housing enclosing a plurality of chambers. A first flow path extends from an inlet to an outlet passing through a bypass chamber. A flow tube has a plurality of perforations being open to a chamber other than the bypass chamber. A second in flow path passes from the inlet to the outlet without passing through the bypass chamber and passing through the perforations. Exhaust gas is introduced into the muffler via the inlet and discharged therefrom via the outlet. A first portion of the exhaust gas flows from the inlet to the outlet along the first flow path. A second portion of the exhaust gas flows from the inlet to the outlet along the second flow path, the first and second portions mixing at (Continued)

least in the outlet chamber. A semi-closed tube has an open end being open to one of the chambers and a closed end.

20 Claims, 16 Drawing Sheets

(58) Field of Classification Search
CPC .............. F01N 13/087; F01N 2470/02; F01N 2490/02; F01N 2490/04; F01N 2490/06; F01N 13/007
USPC .......................... 181/253, 254, 268, 272, 275
See application file for complete search history.

(56) References Cited

U.S. PATENT DOCUMENTS

| | | | |
|---|---|---|---|
| 3,770,081 A | 11/1973 | Martin | |
| 4,467,887 A * | 8/1984 | Vizard | F01N 1/06 181/265 |
| 4,911,262 A * | 3/1990 | Tani | F01N 1/02 181/266 |
| 4,930,597 A * | 6/1990 | Udell | F01N 1/02 181/256 |
| 5,959,263 A * | 9/1999 | Foltz, Jr. | F01N 1/084 181/236 |
| 5,969,299 A | 10/1999 | Yamaguchi et al. | |
| 5,984,045 A | 11/1999 | Maeda et al. | |
| 7,066,296 B2 * | 6/2006 | Uegane | F01N 1/084 137/855 |
| 7,296,657 B2 * | 11/2007 | Ohno | F01N 1/089 181/272 |
| 7,374,016 B2 | 5/2008 | Yamaguchi et al. | |
| 9,617,882 B1 | 4/2017 | Horr | |
| 2004/0178015 A1 * | 9/2004 | Wiemeler | F01N 1/165 181/237 |
| 2004/0238272 A1 * | 12/2004 | Wan | F01N 1/084 181/251 |
| 2010/0140014 A1 | 6/2010 | Han | |

FOREIGN PATENT DOCUMENTS

| | | |
|---|---|---|
| CN | 204716364 U | 10/2015 |
| CN | 105649742 A | 6/2016 |
| RU | 2191628 C2 | 10/2002 |
| WO | 2011161042 A1 | 12/2011 |

OTHER PUBLICATIONS

English translation of CN201461034U retrieved from https://patents.google.com/patent/CN201461034U/en?oq=cn201461034 on Feb. 28, 2020.
English translation of CN204716364U retrieved from https://patents.google.com/patent/CN204716364U/en?oq=CN204716364 on Feb. 28, 2020.
English translation of CN104564237A retrieved from https://patents.google.com/patent/CN104564237A/en?oq=CN104564237 on Feb. 28, 2020.
English translation of CN105649742A retrieved from https://patents.google.com/patent/CN105649742A/en?oq=CN105649742 on Feb. 28, 2020.
International Search Report of PCT/IB2017/054445; Lee W. Young; dated Dec. 1, 2017.
Search Report dated Feb. 4, 2020 by the Russian Patent Office in connection with the corresponding application No. 2019132543.
English Abstract of RU2191628C2 retrieved from https://worldwide.espacenet.com/ on Feb. 7, 2020.
Figure of RU2191628C2 retrieved from https://yandex.ru/patents/doc/RU2191268C2_20021020 on Feb. 7, 2020.

* cited by examiner

MUFFLER FOR AN INTERNAL COMBUSTION ENGINE

CROSS-REFERENCE

The present application claims priority to U.S. Provisional Patent Application No. 62/481,407, filed Apr. 4, 2017, the entirety of which is incorporated herein by reference.

FIELD OF THE TECHNOLOGY

The present technology relates generally to mufflers for internal combustion engines.

BACKGROUND

Vehicles with an internal combustion engine are provided with an exhaust system for discharging exhaust gas from the engine to the atmosphere. The exhaust system includes a muffler for reducing engine noise emitted by the exhaust gas flowing out of the engine. Engine noise is created, in part, as a result of pressure waves produced by the combustion cycles of the engine, and therefore depends on the engine speed among other factors. It is desirable to decrease engine noise for a wide range of engine speeds, and without affecting the performance of the engine too much FIG. 1 shows an example of a prior art muffler 900 which comprises a housing 902 enclosing two chambers 930 and 932. An inlet tube 904 connected to the left chamber 930 introduces exhaust gas from the engine into the muffler 900. The left chamber 930 is fluidly connected to the right chamber 932 by a tube 970. An outlet tube 906 is fluidly connected to the right chamber 932 for discharging exhaust gas from the muffler 900. Exhaust gas flowing from the inlet tube 904 into the left chamber 930 experiences an expansion and acoustic reflections within the left chamber 930 which reduce the amplitude of the pressure wave, thereby attenuating engine noise. Exhaust gas then flows from the left chamber 930 via the tube 970 into the right chamber 932 where it undergoes further expansion and thereby further attenuation of engine noise, before finally flowing out of the right chamber 932 via the outlet tube 906. However, mufflers of the type described above are not always sufficiently efficient at attenuating engine noise in a wide range of frequencies.

It would be desirable to obtain greater attenuation of engine noise. Furthermore, it would be desirable to obtain an increased attenuation of engine noise without increasing backpressure in the engine and without increasing the size, weight and/or complexity of the muffler. It would also be desirable to tune the attenuation of engine noise to particular desired frequencies.

SUMMARY

It is an object of the present technology to ameliorate at least some of the inconveniences present in the prior art.

According to one aspect of the present technology, there is provided a muffler for an internal combustion engine. The muffler has a housing enclosing a plurality of chambers including an outlet chamber and a bypass chamber. An inlet receives exhaust gas from the engine. An outlet discharges exhaust gas from the muffler, the outlet opening to the outlet chamber. At least the inlet, the outlet, the outlet chamber, and the bypass chamber define a first flow path extending from the inlet to the outlet and passing through the bypass chamber. A flow tube defines a passage upstream of the bypass chamber, the first flow path being defined at least in part by the flow tube. A plurality of perforations are defined in a portion of the flow tube, each of the plurality of perforations being open to one of the plurality of chambers other than the bypass chamber. At least the inlet, the outlet, the outlet chamber, and the plurality of perforations define a second flow path extending from the inlet to the outlet without passing through the bypass chamber, the second flow path passing through the plurality of perforations. Exhaust gas is introduced into the muffler via the inlet and discharged from the muffler via the outlet. A first portion of the exhaust gas flows from the inlet to the outlet along the first flow path and a second portion of the exhaust gas flows from the inlet to the outlet along the second flow path, the first portion mixing with the second portion at least in the outlet chamber. A semi-closed tube has an open end and a closed end opposite the open end, the open end of the semi-closed tube being open to one of the plurality of chambers.

In some implementations, the plurality of chambers is at least three chambers including an inlet chamber, the outlet chamber and the bypass chamber. The inlet opens into the inlet chamber. Each perforation of the plurality of perforations is open to one of the at least three chambers other than the inlet chamber and the bypass chamber.

In some implementations, the inlet is defined by an inlet tube extending from a first end being open to the inlet chamber to a second end being open outside the muffler.

In some implementations, the flow tube has a first end open to the inlet chamber and a second end opposite the first end being open to one of the at least three chambers other than the outlet chamber and the inlet chamber.

In some implementations, the second end of the flow tube is open to the bypass chamber, the flow tube fluidly communicating the inlet chamber with the bypass chamber.

In some implementations, the plurality of perforations is open to the outlet chamber.

In some implementations, the at least three chambers is three chambers. The flow tube is a first flow tube fluidly communicating the inlet chamber with the bypass chamber. The passage defined by the first flow tube is a first passage. The muffler further includes a second passage fluidly connecting the bypass chamber with the outlet chamber. The first flow path passing from the inlet to the inlet chamber, from the inlet chamber via the first passage to the bypass chamber, from the bypass chamber via the second passage to the outlet chamber and from the outlet chamber out of the muffler via the outlet. The second flow path passing from the inlet to the inlet chamber, from the inlet chamber via a portion of the first passage and through the plurality of perforations into the outlet chamber and from the outlet chamber out of the muffler via the outlet.

In some implementations, a second flow tube fluidly connects the bypass chamber to the outlet chamber and defines the second passage.

In some implementations, the bypass chamber is disposed adjacent a first end of the housing, the inlet chamber is disposed adjacent a second end of the housing opposite the first end of the housing, and the outlet chamber is disposed between the inlet chamber and the bypass chamber.

In some implementations, the at least three chambers is four chambers including the inlet chamber, the outlet chamber, the bypass chamber and a fourth chamber.

In some implementations, the plurality of perforations is open to the fourth chamber.

In some implementations, the bypass chamber is disposed adjacent a first end of the housing.

In some implementations, the open end of the semi-closed tube is open to the inlet chamber.

In some implementations, the flow tube extends from the inlet to one of the plurality of chambers other than the outlet chamber.

In some implementations, the plurality of perforations is open to the outlet chamber.

In some implementations, an outlet tube extends from a first end being open to the outlet chamber to a second end being open outside the muffler, the outlet being defined by the outlet tube.

In some implementations, the outlet tube further comprises a spark arrestor.

In some implementations, the first flow path and the second flow path join at least in the outlet chamber and are configured to provide a first resonant attenuation frequency for attenuation of sound waves, and the semi-closed tube is configured to provide a second resonant attenuation frequency for attenuation of sound waves.

In some implementations, the second resonant attenuation frequency is greater than the first resonant attenuation frequency.

In some implementations, the second resonant attenuation frequency is an anti-resonant frequency with respect to the first resonant attenuation frequency.

According to another aspect of the present technology, there is provided a powerpack having an internal combustion engine with at least one exhaust port and a muffler according to any one of the above implementations. The inlet of the muffler is fluidly connected to the at least one exhaust port to receive exhaust gas therefrom.

According to another aspect of the present technology, there is provided a vehicle having the powerpack.

For the purpose of this application, terms related to spatial orientation such as upper, lower, downwardly, rearward, forward, front, rear, left, right, above and below are described using a reference frame in which exhaust gas enters into the muffler from a left side thereof and exits the muffler from a right side thereof and in which the muffler has an elliptical cross-section in a plane extending vertically and longitudinally, the major axis of the elliptical cross-section extending horizontally. The orientation shown herein and the reference frame selected for description are purely for simplicity of description. Directional terms such as front, rear, upper and lower are relative terms and not intended to be limiting.

Implementations of the present technology have at least one of the above-mentioned object and/or aspects, but do not necessarily have all of them.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Although the description below is provided with respect to a side-by-side vehicle 10 having a four-stroke, two-cylinder inline internal combustion engine, aspects of the present technology can be applied to other types of vehicles and other types of engines.

Figure 2:
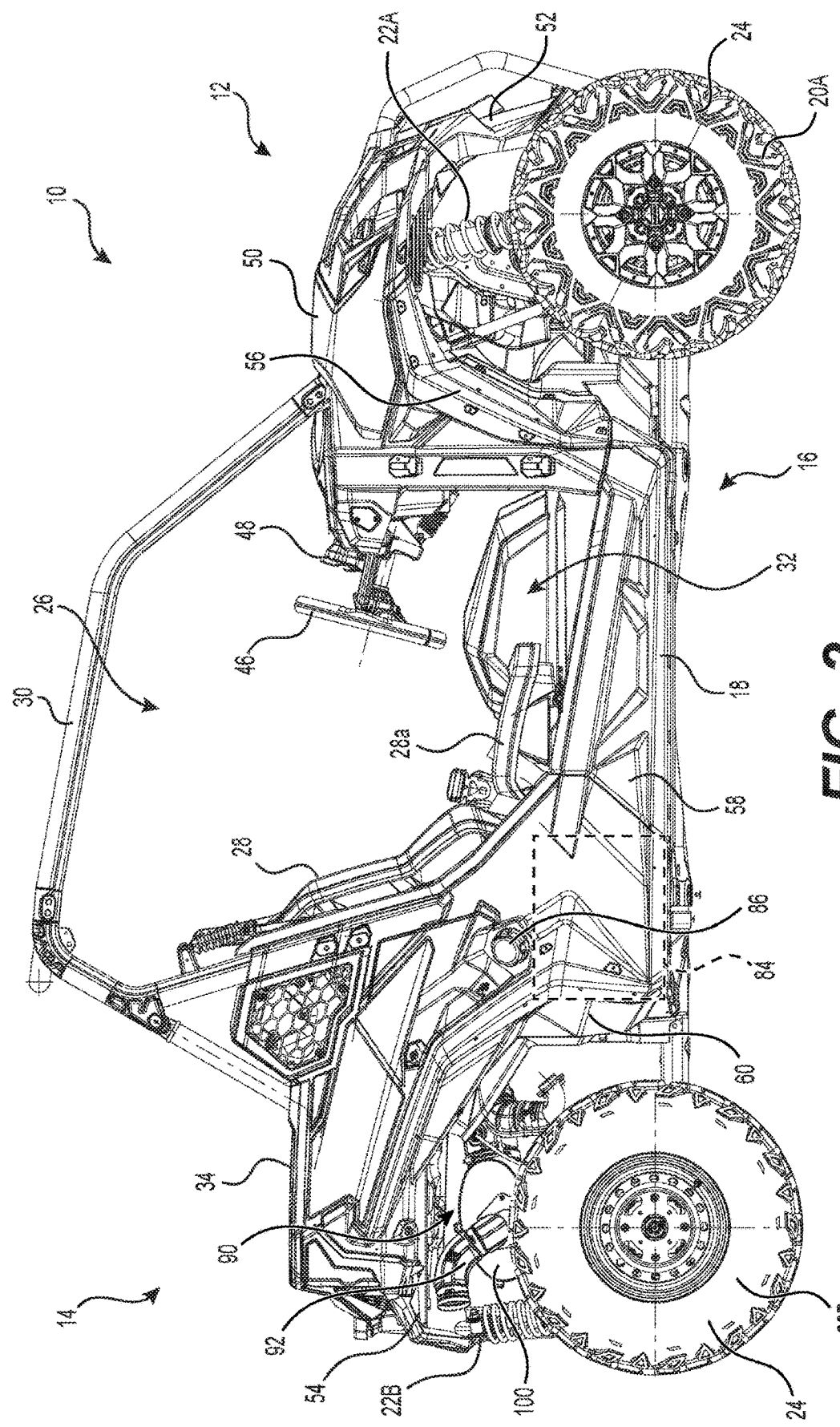
FIG. 2 is a right side elevation view of a vehicle having mounted thereon a muffler according to one implementation of the present technology.

With reference to FIG. 2, a side-by-side vehicle (SSV) 10 has a front end 12, a rear end 14, and two lateral sides 16 (left and right). The SSV 10 includes a frame 18. A pair of front wheels 20A is suspended from the front portion of the frame 18 via front suspension assemblies 22A. A pair of rear wheels 20B is suspended from the rear portion of the frame 18 via rear suspension assemblies 22B. Each of the four wheels 20A, 20B has a tire 24.

A cockpit area 26 is disposed in the middle portion of the frame 18. Left and right seats 28 are connected to the middle portion of the frame 18. A roll cage 30 is connected to the frame 18 and is disposed above the cockpit area 26. The roll cage 30 is an arrangement of metal tubes that contributes to protecting the riders. The cockpit area 26 is open at the two lateral sides 16 of the SSV 10, forming two lateral passages 32 (left and right), through which the riders can ingress and egress the SSV 10. It is contemplated that doors could be provided in the two lateral passages 32 to selectively partially close the lateral passages 32.

A cargo box 34 is mounted to the frame 18 rearward of the seats 28. It is contemplated that the cargo box 34 could be replaced by a cargo rack or that the cargo box 34 could be omitted.

A steering device including a steering wheel 46 is disposed in front of the left seat 28. It is contemplated that the steering wheel 46 could be disposed in front of the right seat 28. The steering device is operatively connected to the two front wheels 20A to permit steering of the SSV 10. A display cluster 48 is disposed in front of the steering wheel 46. A throttle operator in the form of a throttle pedal (not shown) is disposed over the floor of the cockpit area 26 below the steering wheel 46 and in front of the left seat 28.

The SSV 10 has a vehicle body mounted to the frame 18. The vehicle body includes a hood 50, a front body panel 52, a rear body panel 54 and a number of side body panels 56, 58, 60. It is also contemplated that the vehicle body of the SSV 10 could have more or less body panels than described above.

Figure 3A:
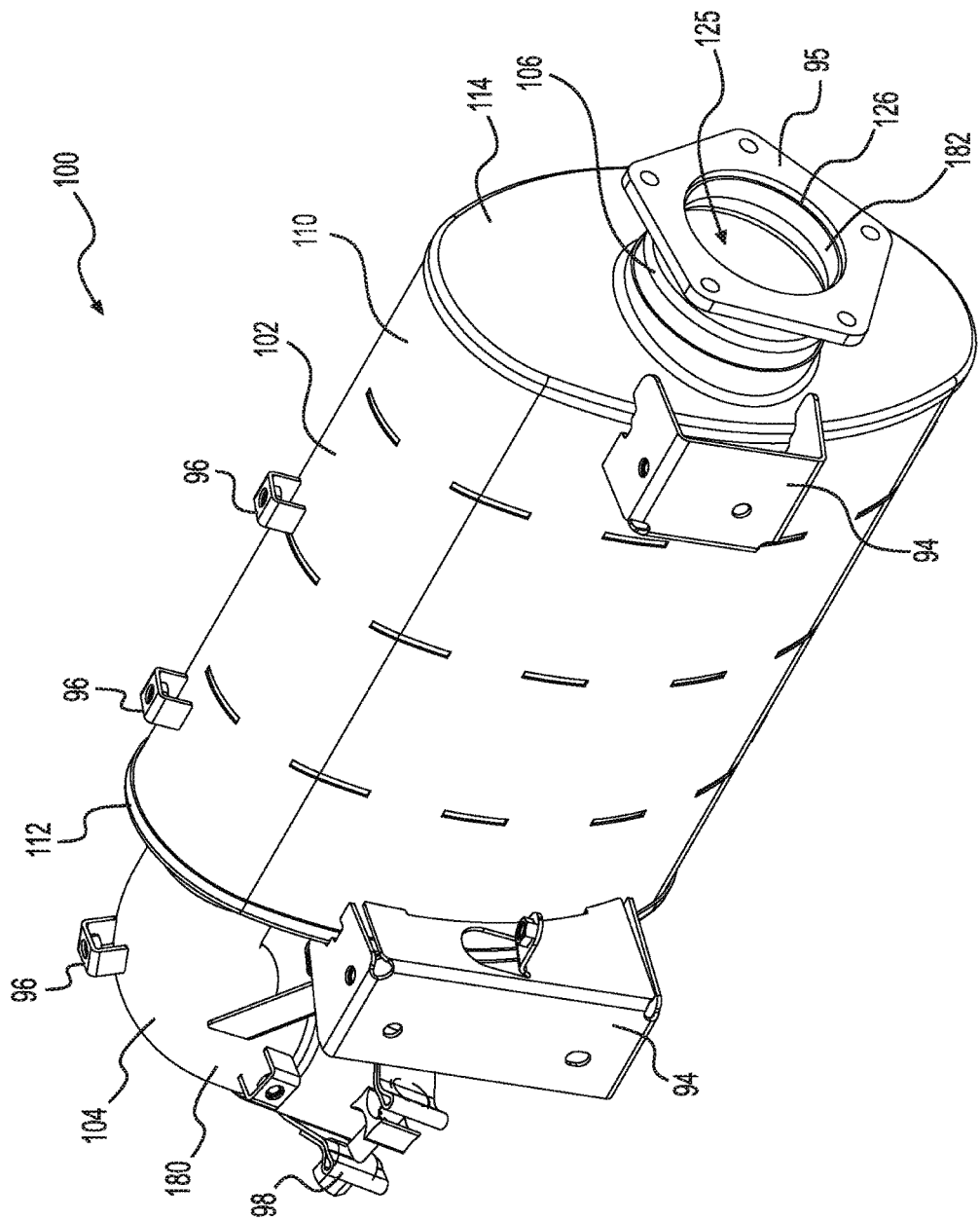
FIG. 3A is a perspective view, taken from a bottom, rear and right side, of the muffler of FIG. 2 shown in isolation.
Figure 3B:
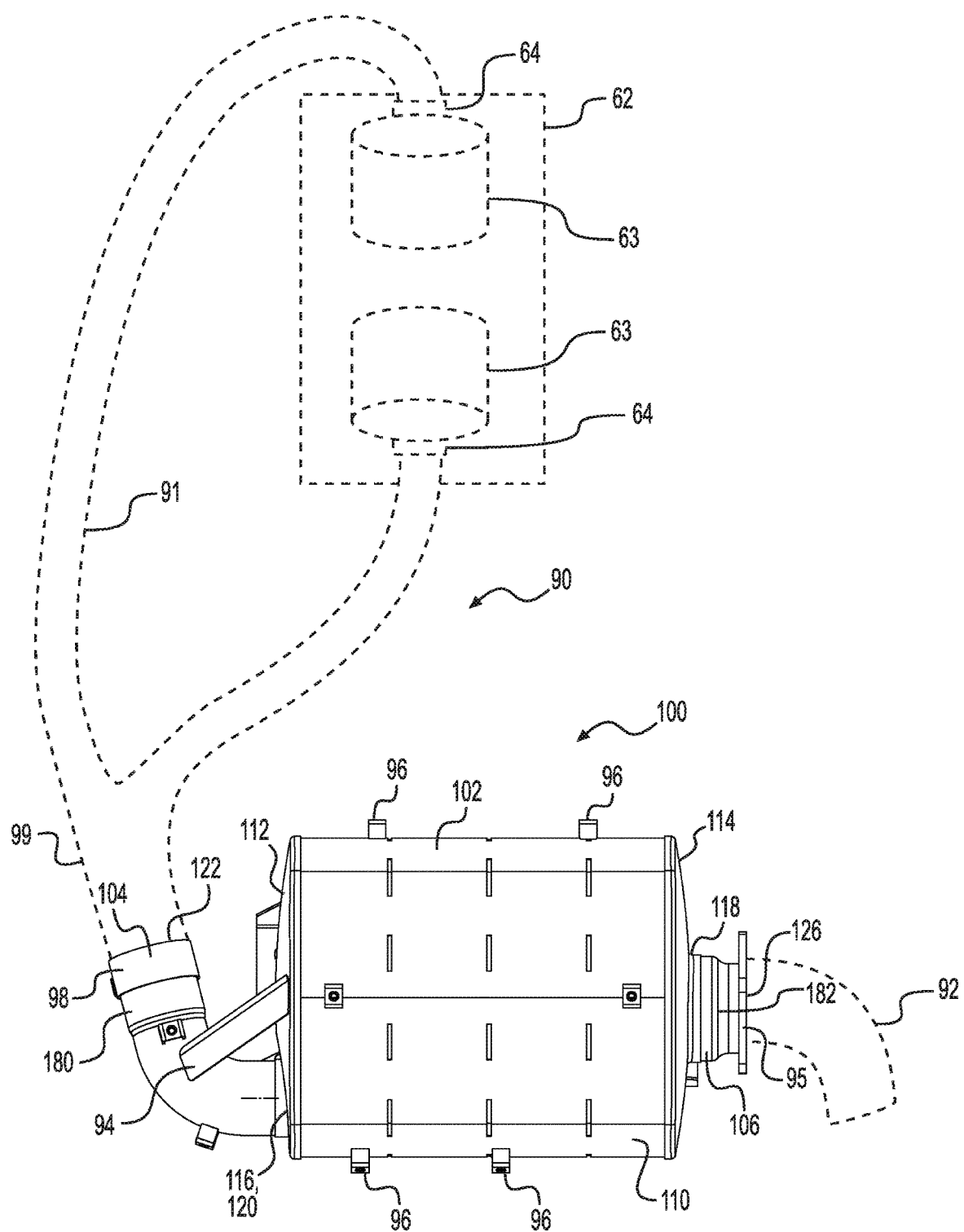
FIG. 3B is a top plan view of the muffler of FIG. 3A shown along with a schematic illustration of the engine and the exhaust system of the vehicle of FIG. 2.
Figure 3C:
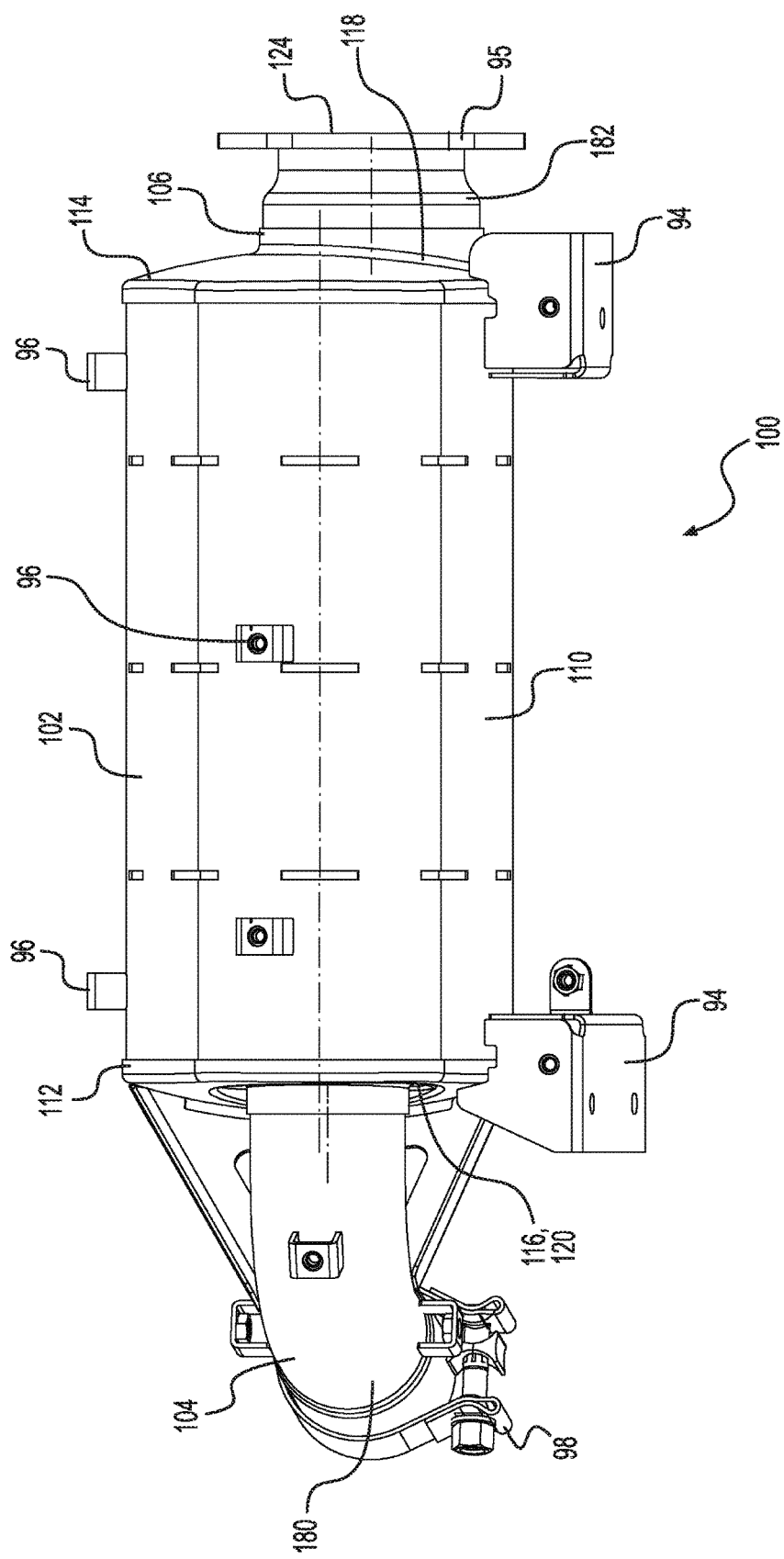
FIG. 3C is a rear elevation view of the muffler of FIG. 3A.

The SSV 10 is powered by an internal combustion engine 62 (shown schematically in FIG. 3B). In the illustrated implementation of the SSV 10, the engine 62 is a four-stroke, V-type engine having two cylinders 63 (shown schematically in FIG. 3B). It is however contemplated that the engine 62 could be a different type of internal combustion engine, for example, an inline three-cylinder engine. The engine 62 is disposed rearward of the seat bases 28A below the cargo box 34. The engine 62 is operatively connected to the front and rear wheels 20A and 20B. It is contemplated that only two of the four wheels 20A, 20B could be driven by the engine 62.

Fuel to be delivered to the engine 62 is stored in a fuel tank 84 (shown schematically in FIG. 2) disposed to the right of the engine 62 and in part rearward of the right seat base 28A. A removable fuel cap 86 covers the fuel tank inlet of the tank. It is contemplated that the fuel tank 84 could be disposed on the left side of the engine 62.

Figure 1:
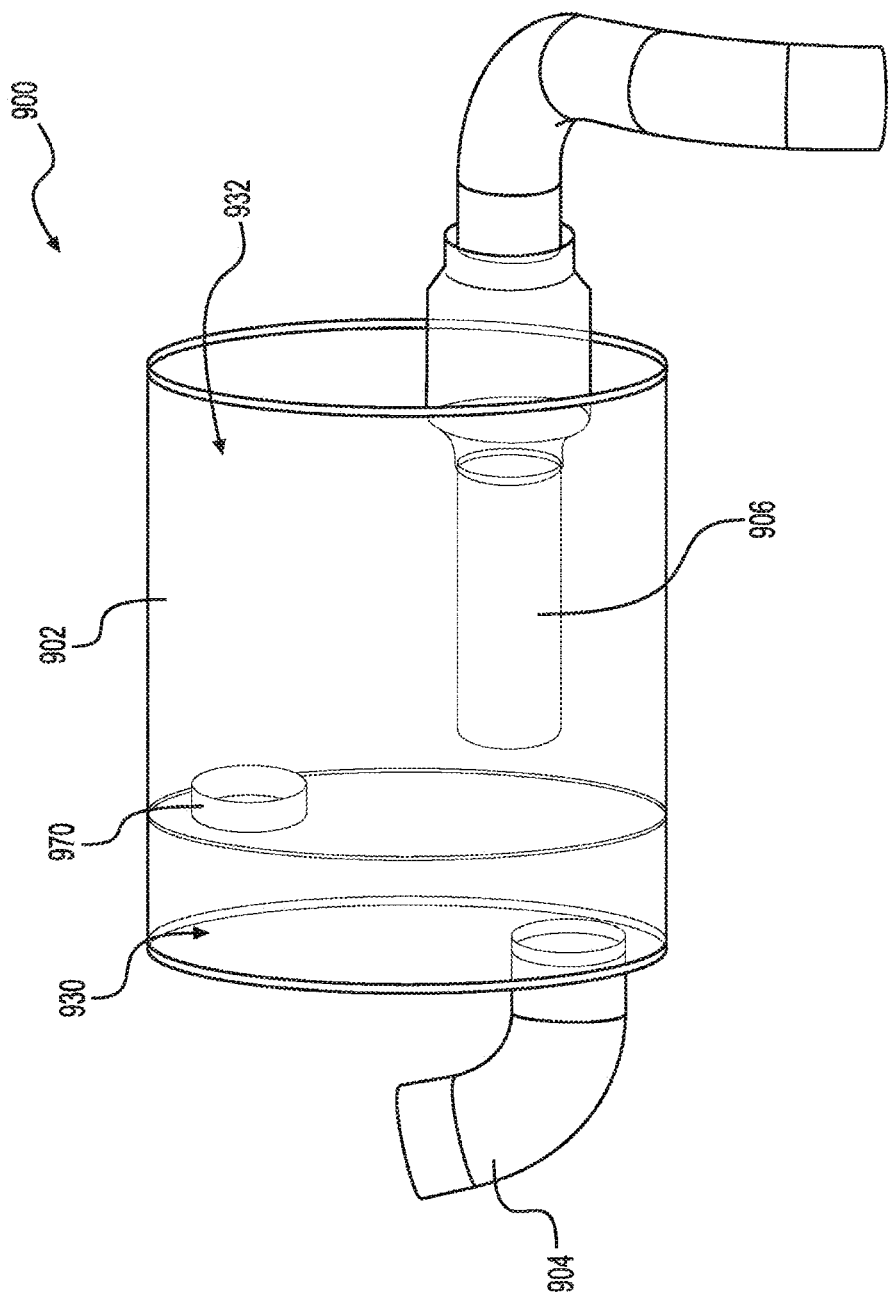
FIG. 1 is a schematic illustration of a prior art muffler.

With reference to FIGS. 1 and 3B, exhaust gas expelled by the engine 62 is discharged to the atmosphere via an exhaust system 90 including a muffler 100, exhaust manifold 91 and an exhaust conduit 92. The muffler 100 extends laterally below the cargo box 34. As can be seen in FIG. 3B, the muffler 100 is connected to an exhaust port 64 of each cylinder 63 by the exhaust manifold 91. The muffler 100 discharges gases to the atmosphere via the exhaust conduit 92 which has an outlet facing rearwardly on a right side of the SSV 10. It is contemplated that muffler 100 could be mounted in a different orientation than as shown herein.

The muffler 100 will be described in further detail with reference to FIGS. 3A to 5.

With reference to FIGS. 3A to 3D, the muffler 100 has the general shape of a cylindroid (more specifically, an elliptical cylinder in the illustrated implementation) having two closed ends. The muffler 100 includes a housing 102, an inlet tube 104 and an outlet tube 106. Two mounting brackets 94 are connected to the housing 102 to enable mounting of the muffler 100 to the frame 18 of the SSV 10. Mounting tabs 96 connected to the housing 102 and inlet tube 104 enable mounting of an outer shell (not shown) to the muffler 100. Exhaust gas from the engine 62 is introduced into the muffler 100 via the inlet tube 104 and is discharged from the muffler 100 via the outlet tube 106. The muffler 100 is configured to attenuate sound waves as will be described below in further detail.

The housing 102 includes an outer wall 110 that is elliptic cylindrical, a left end cap 112 capping the left end of the outer wall 110 and a right end cap 114 capping the right end of the outer wall 110. In the illustrated implementation, the muffler 100 is an elliptic cylindrical muffler but it is contemplated that the muffler 100 could be shaped other than as shown. For example, the muffler 100 could be cylindrical with a uniformly circular cross-section or have portions with different diameters.

Figure 3D:
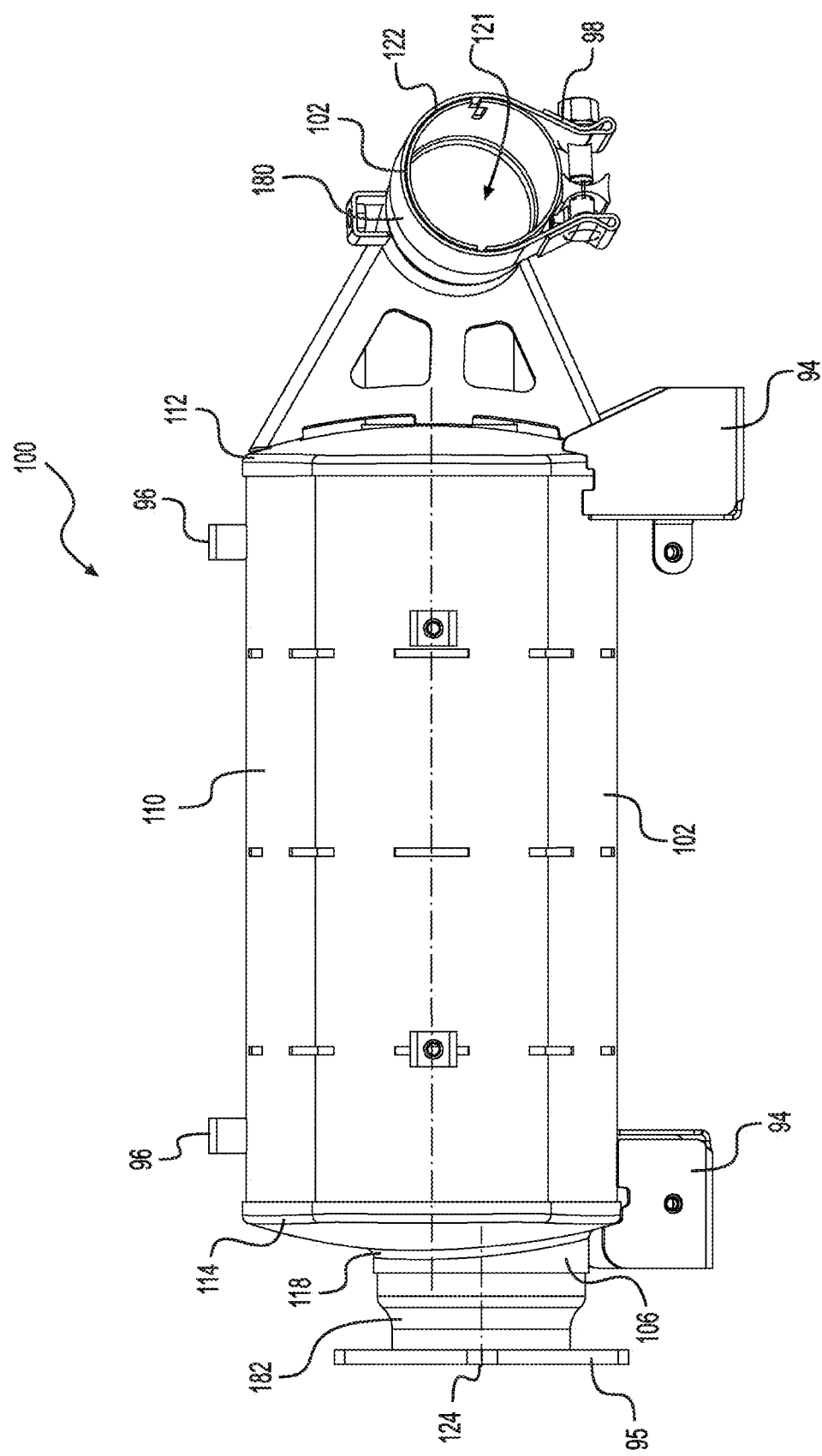
FIG. 3D is a front elevation view of the muffler of FIG. 3A.
Figure 4A:
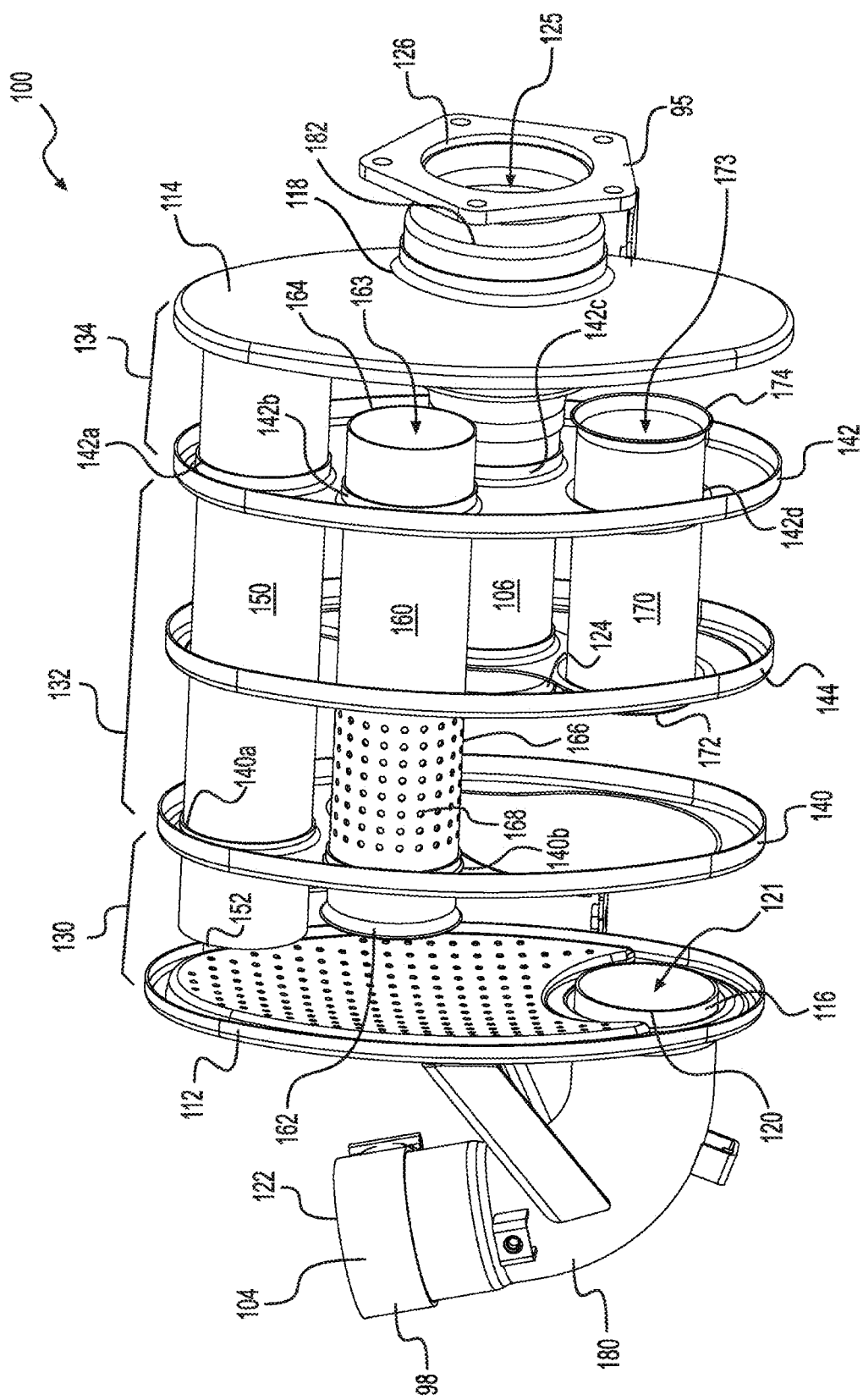
FIG. 4A is a perspective view, taken from bottom, rear and right side, of a portion of the muffler of FIG. 3A with a wall of the housing removed for clarity.
Figure 4B:
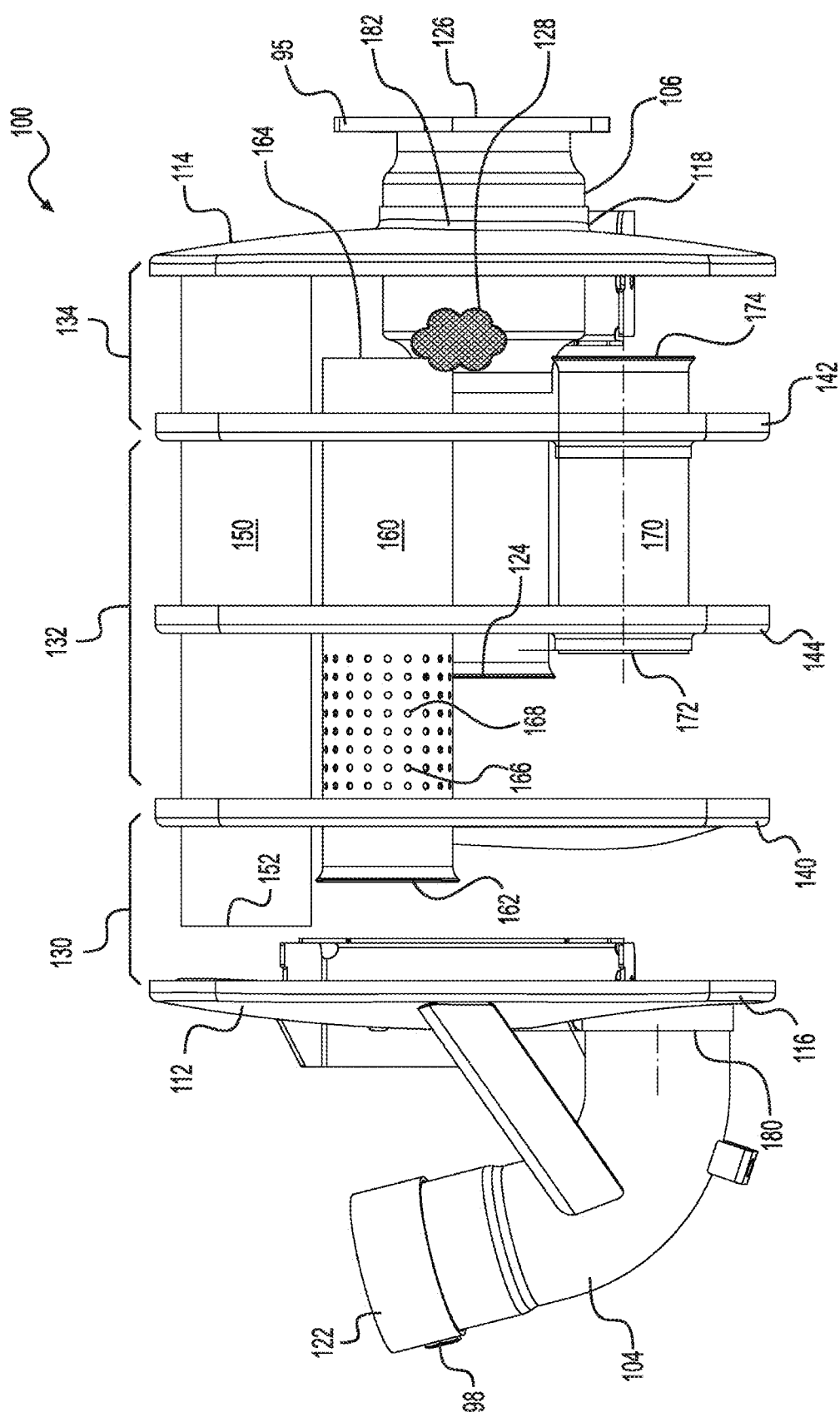
FIG. 4B is a top plan view of the muffler portion of FIG. 4A with a portion of the outlet tube being partly cut-away to show a spark arrestor.
Figure 4C:
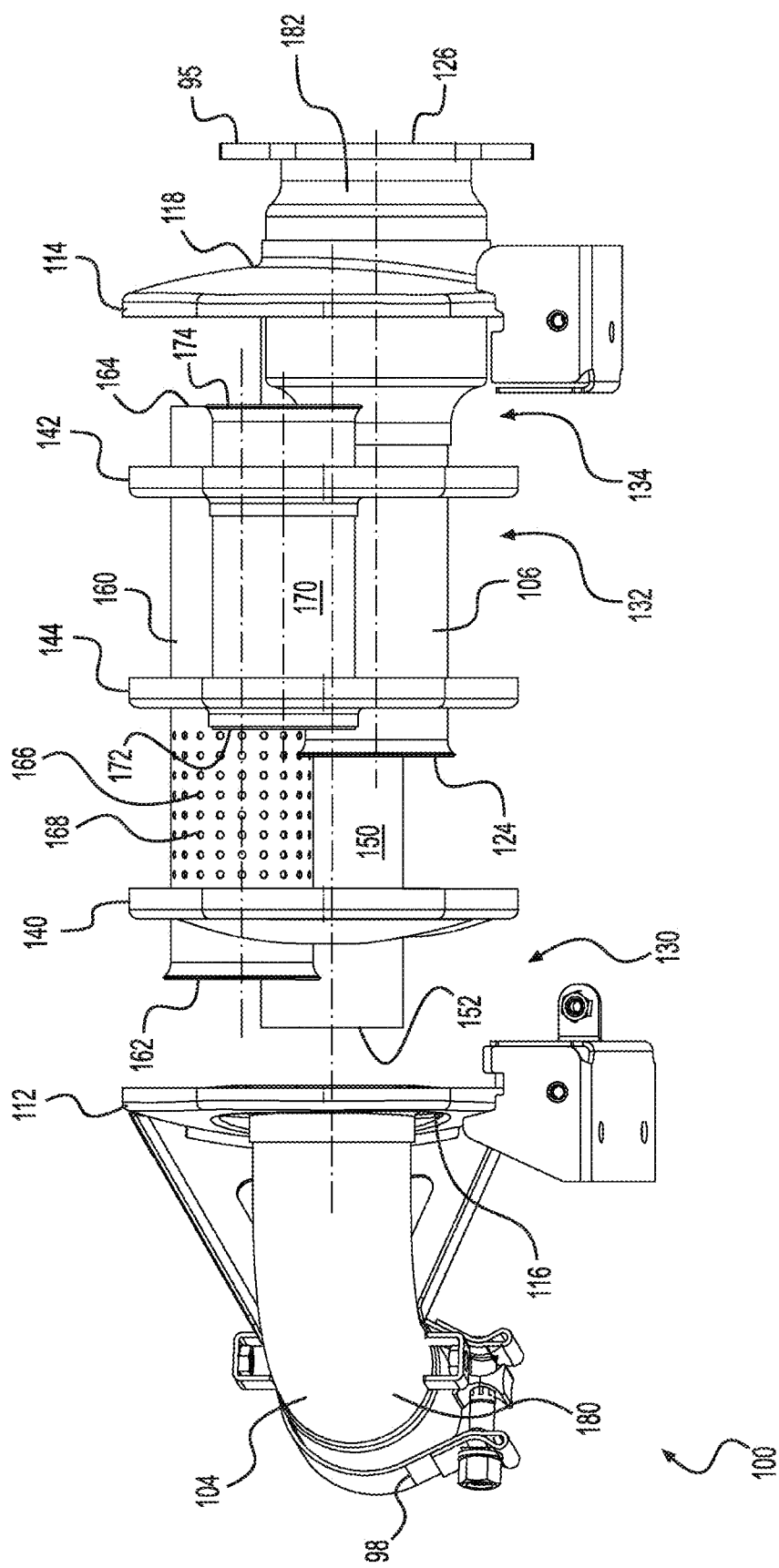
FIG. 4C is a rear elevation view of the muffler portion of FIG. 4A.
Figure 4D:
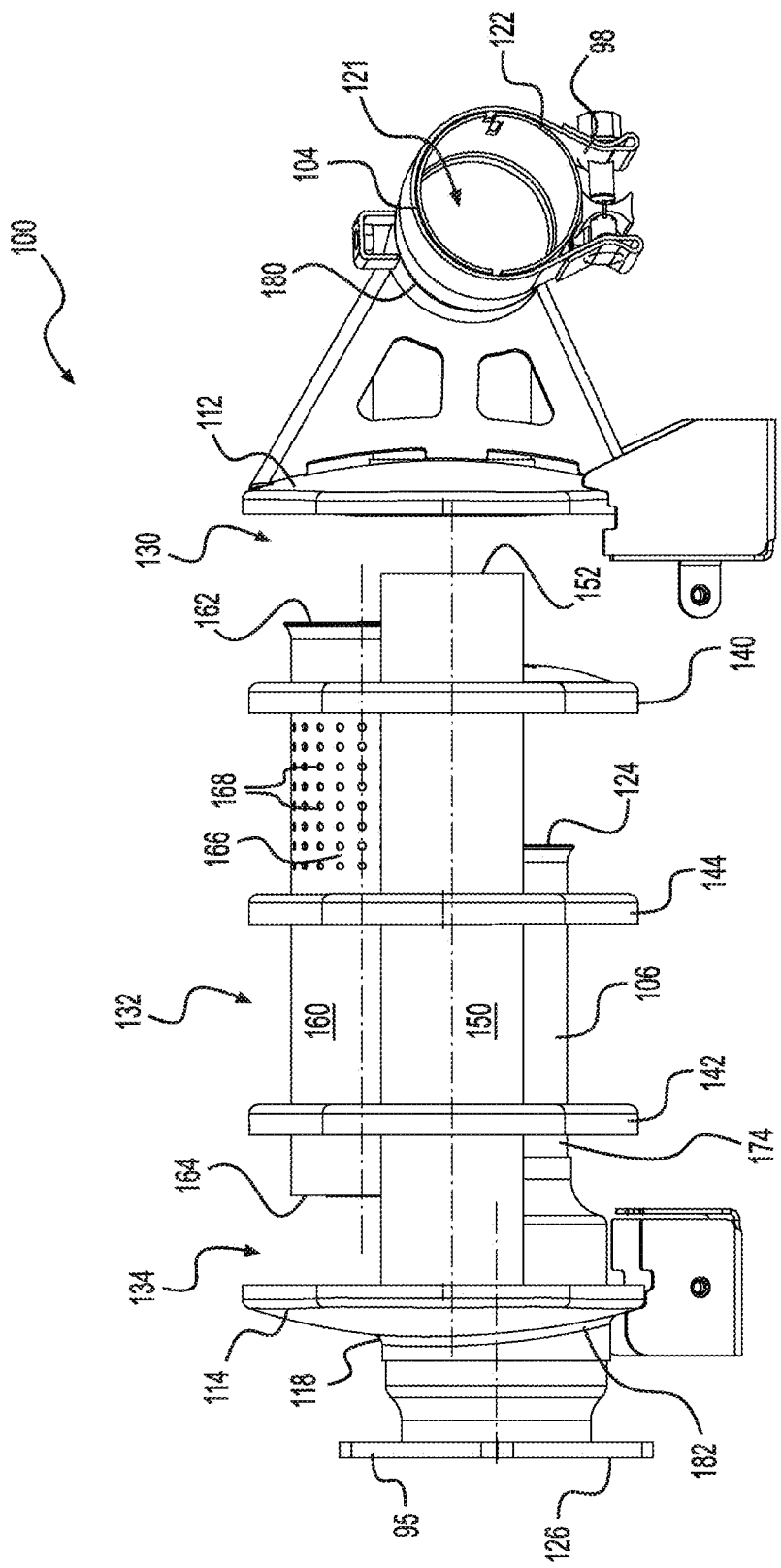
FIG. 4D is a front elevation view of the muffler portion of FIG. 4A.
Figure 4E:
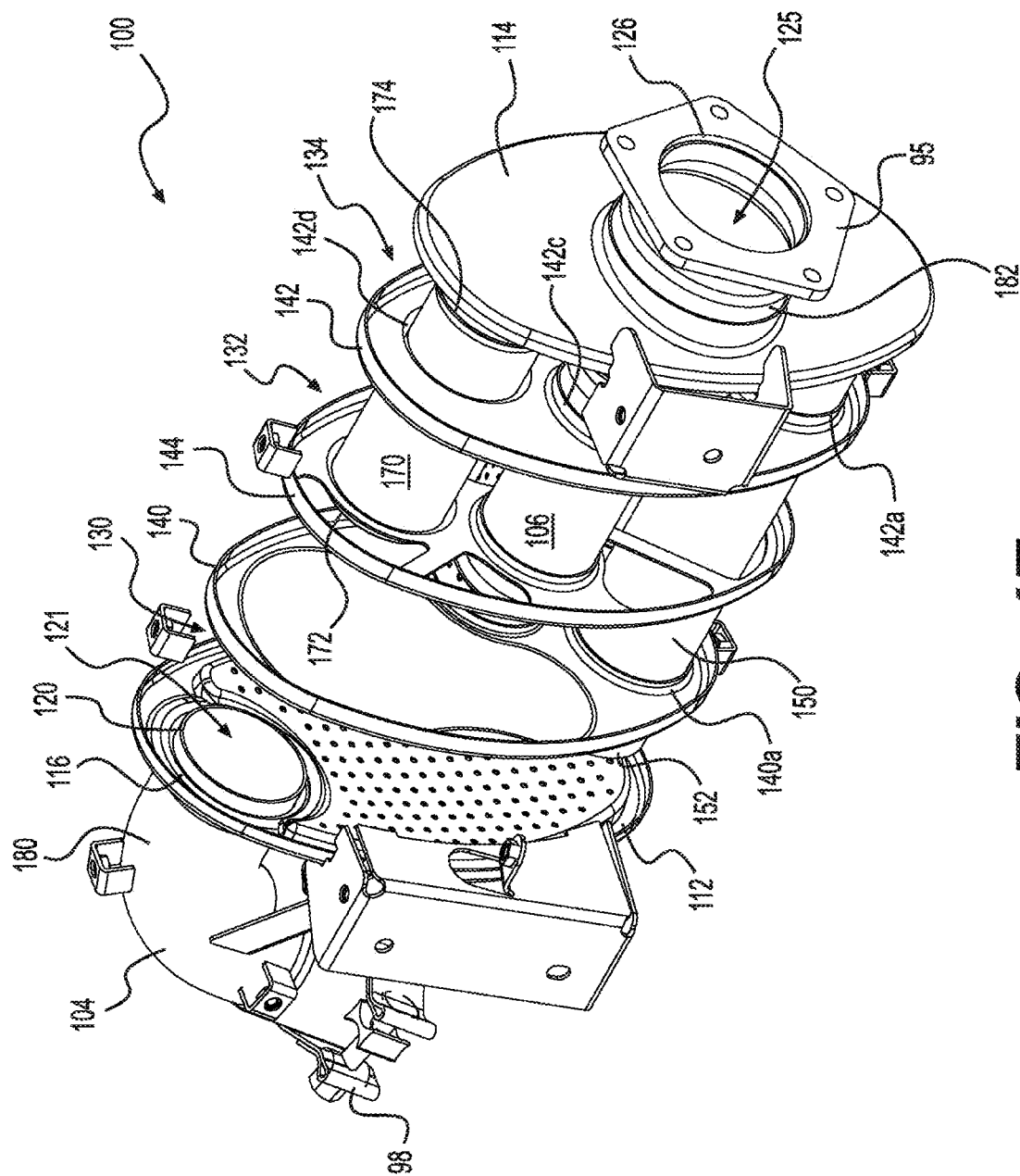
FIG. 4E is another perspective view, taken from bottom, rear and right side, of a portion of the muffler portion of FIG. 4A.

With reference to FIGS. 4A to 4E, an opening 116 is defined in the left end cap 112. A right end 120 of the inlet tube 104 is connected around the opening 116. The inlet tube 104 extends outwardly away from the left end cap 112 to a left end 122 which forms an opening and which is fluidly connected to the engine 62. The inlet tube 104 defines a passage 121 (FIG. 3D). As can be seen the inlet tube 104 curves forwardly to the end 122, but it is contemplated that the shape of the inlet tube 104 could be other than as shown herein. The end 122 of the inlet tube 104 has a clamp 98 connected thereto to facilitate connection of the inlet tube 104 to a conduit 99 (shown schematically in FIG. 3B) of the exhaust manifold 91 leading to the exhaust ports 64 of the cylinders 63 of the engine 62.

An opening 118 is defined in the right end cap 114. The outlet tube 106 extends through the opening 118. A left end 124 of the outlet tube 106 is disposed inside the housing 102 as can be seen best in FIG. 4B, and a right end 126 of the outlet tube 106 is disposed outside the housing 102. The right end 126 of the outlet tube 106 has a mounting bracket 95 to which the conduit 92 (FIG. 2) is connected to. The outlet tube 106 defines a passage 125 through which exhaust gas flows out of the muffler 100.

A spark arrestor 128 (FIG. 4B) is connected to the portion of the outlet tube 106 disposed outside the housing 102 to prevent emission of sparks and flammable debris from the engine 62. The spark arrestor 128 is in the form of a mesh lining the interior surface of the outlet tube 106. In the illustrated implementation, the mesh is made of fine steel but it is contemplated that the spark arrestor could be in any suitable form. It is contemplated that the spark arrestor 128 could be omitted.

With reference to FIGS. 4A to 4E, the muffler 100 includes three chambers 130, 132, 134 enclosed by the housing 102. Also enclosed within the housing 102 are tubes 150, 160, 170, baffles 140 and 142, and a support bracket 144.

The chambers 130, 132, 134 are defined in part by the baffles 140 and 142 connected to the outer wall 110. The left chamber 130 is defined by the left end cap 112, the left baffle 140 and the outer wall 110. The middle chamber 132 is defined by the baffles 140 and 142 and the outer wall 110. The right chamber 134 is defined by the right baffle 142, the right end cap 114 and the outer wall 110.

The support bracket 144 is disposed in the middle chamber 132 between the left and right baffles 140, 142 and is connected to the outer wall 110. The support bracket 144 supports the left end 124 of the outlet tube 106 and a left end 172 of the tube 170. It is contemplated that the support bracket 144 could be omitted.

The exhaust port 64 of the engine 62 is fluidly connected to the left chamber 130 via the passage 121 of the inlet tube 104. It is contemplated that the right end 120 of the inlet tube 104 could extend into the left chamber 130 instead of being connected to the opening 116 of the left end cap 112.

The left end 124 of the outlet tube 106 is disposed inside the middle chamber 132 for fluidly connecting the middle chamber 132 to the outside via the outlet passage 125. It is contemplated that, instead of having the open left end 124 extending through an opening 142c of the baffle 142 into the middle chamber 132, the left end 124 could be connected to the baffle 142 around the opening 142c for fluidly connecting the outlet tube passage 125 to the middle chamber 132.

The tube 150 is a semi-closed tube having a left end 152 being open and the right end 154 (FIG. 5) being closed. The tube 150 will be referred to hereinafter as semi-closed tube 150. In the illustrated implementation, the open left end 152 is disposed in the left chamber 130 and the closed right end 154 is connected to the right end cap 114. The semi-closed tube 150 extends through the openings 142a and 140a of the right and left baffles 142, 140 respectively. It is however contemplated that the open left end 152 could be disposed in one of the other chambers 132, 134 instead of the left chamber 130. Similarly, the right end 154 could be disposed within one of the chambers 130, 132, 134, or even extend out of the housing through the right end cap 114. It is contemplated that instead of the semi-closed tube 150 being formed with a closed right end 154, the right end 154 could be closed by having the right end cap 114 abutting thereagainst to effectively form a semi-closed tube 150. It is further contemplated that the semi-closed tube 150 could have the left end 152 being closed and the right end 154 being open as long as the open end is open to one of the chambers 130, 132, 134. The semi-closed tube 150 serves as a quarter-wave tube to provide a resonance for attenuation of the sound waves within the chamber 130, 132, 134 fluidly connected to the open end 152. Attenuation of sound waves by the muffler 100 will be described below in further detail.

The tube 160 is an open tube with both ends 162, 164 being open. The left end 162 is disposed in the left chamber 130 and the right end 164 is disposed in the right chamber 134. The tube 160 extends through openings 140b, 142b of the baffles 140, 142 respectively and defines a passage 163 fluidly connecting the left chamber 130 with the right chamber 134. It is contemplated that the left end 162 of the tube 160 could be connected to the opening 140b of the left baffle 140 instead of extending into and being disposed in the left chamber 130. It is contemplated that the right end 164 of the tube 160 could be connected to the opening 142b of the right baffle 142 instead of extending into and being disposed in the right chamber 134.

The tube 160 has a perforated portion 166 which has a plurality of perforations 168 extending through the wall of the tube 160. The perforated portion 166 is disposed in the middle chamber 132 such that the perforations 168 fluidly connect the passage 163 with the middle chamber 132.

The tube 170 is an open tube with both ends 172, 174 being open. The left end 172 is disposed in the middle chamber 132 and the right end 174 is disposed in the right chamber 134. The tube 170 is disposed below the outlet tube 106 and extends through an opening 142d of the right baffle 142. The tube 170 defines a passage 173 fluidly connecting the middle chamber 132 with the right chamber 134. It is contemplated that the tube 170 could be omitted and the passage 173 fluidly connecting the middle chamber 132 with the right chamber 134 could be formed by the opening 142d in the baffle 142. It is also contemplated that one of the left or right ends 172, 174 of the tube 170 could be connected to the opening 142d of the right baffle 142 instead of extending through the right baffle 142 into the chamber 132 or 134 on the other side thereof.

The relative sizes of the chambers 130, 132, 134, relative to one another, and relative to the tubes 150, 160, 170, 104, and 106 can be different than as shown herein. The positions of the tubes 150, 160, 170, 104, and 106 within the chambers 130, 132, 134 and relative to one another can also be different than as shown herein. The lengths of the tubes 160, 170 could also be different from that shown herein. The length and position of the perforated portion 166 could also be different from that shown herein. In general, the chambers 130, 132, 134 and the tubes 150, 160, 170, 104, and 106 as well as the perforated portion 166 are configured to achieve attenuation of desired frequencies as will be described below.

Figure 5:
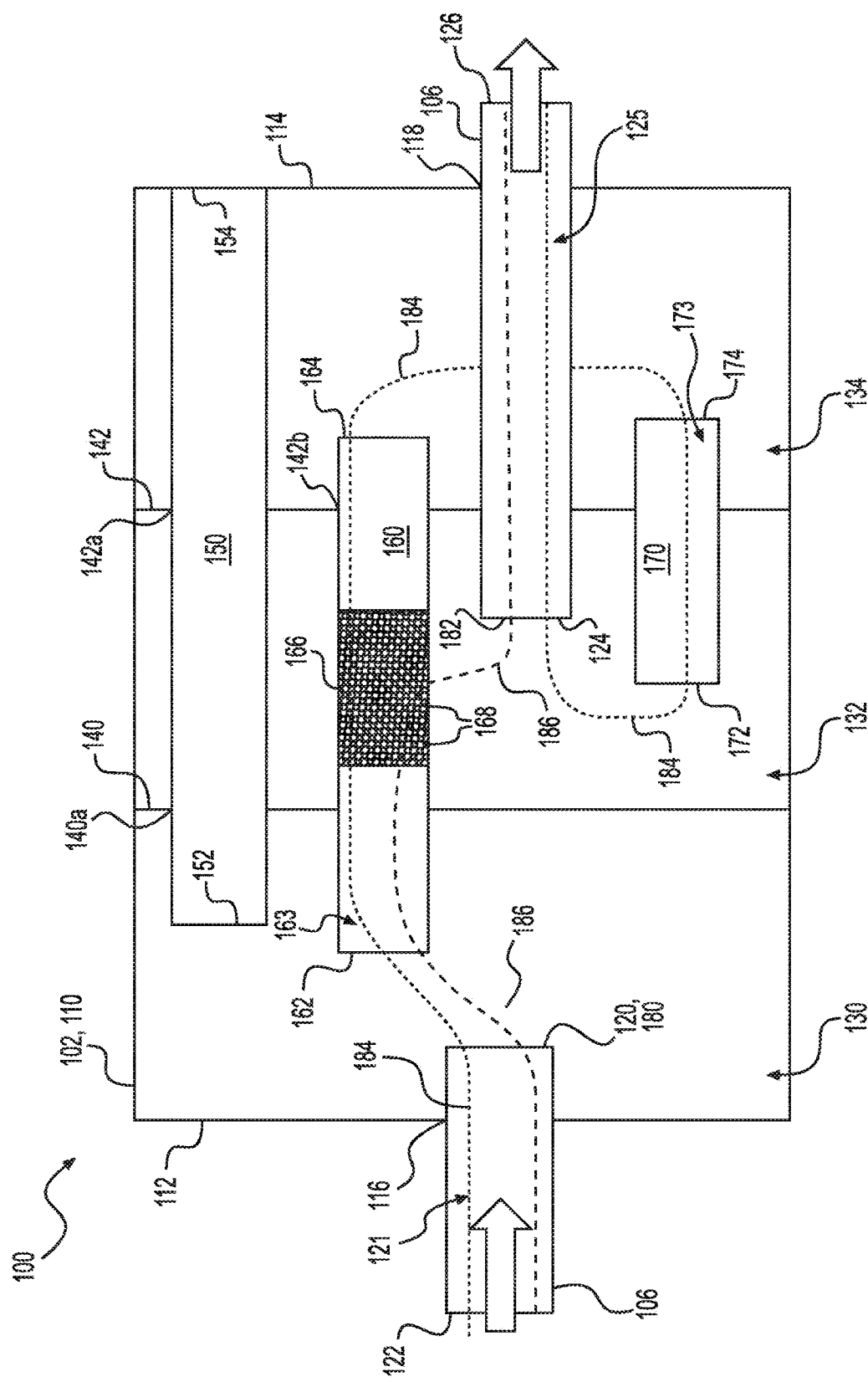
FIG. 5 is a schematic illustration of the muffler of the FIG. 3A showing the flow paths therethrough.

With reference to FIG. 5, the flow of exhaust gas through the muffler 100 will now be described. It is implied that sound waves are propagating within the exhaust gas flow.

Exhaust gas enters through the inlet 180 and exits through the outlet 182. After entering through the inlet 180, a first portion of the exhaust gas flows to the outlet 182 via a first flow path 184 and a second portion of the exhaust gas flows to the outlet 182 via a second flow path 186.

In the illustrated implementation, exhaust gas enters from the inlet tube 104 into the left chamber 130, expanding therein before flowing into the tube 160 via the left end 162 thereof. The first portion of the exhaust gas exits the tube 160 through the right end 164 thereof and expands into the right chamber 134. The first portion of the exhaust gas flows from the right chamber 134 through the tube 170 into the middle chamber 132. From the middle chamber 132, the exhaust gas flows out of the muffler 100 via the outlet 182 and the outlet tube passage 125. The second portion of the exhaust gas flows out of the tube 160 through the perforations 168 into the middle chamber 132 thereby avoiding the right chamber 134. In the middle chamber, the second portion of the exhaust gas mixes with the first portion of the exhaust gas that flowed into the middle chamber 132 bypassing the right chamber 134. From the middle chamber 132, all of the exhaust gas flows out of the muffler 100 via the outlet tube 106.

Thus, the first flow path 184 taken by the first portion of the exhaust gas passes from the tube 104 to the left chamber 130, then from the left chamber 130 through the passage 163 of the tube 160 into the right chamber 134. From the right chamber 134, the first flow path 184 passes through the passage 173 of the tube 170 into the middle chamber 132. From the middle chamber 132, the first flow path 184 passes through the outlet tube 106 and thereby out of the muffler 100.

The second flow path 186 taken by the second portion of the exhaust gas passes from the inlet tube 104 into the left chamber 130, and then enters into the tube 160 through the left end 162 thereof. After entering the tube 160 through the left end 162, the second flow path 186 passes through the perforations 168 of the perforated portion 166 into the middle chamber 132. Thus, the second flow path 186 does not traverse the entirety of the passage 163 of the tube 160 but only a portion of the passage 163 up to the perforated portion 166. From the middle chamber 132, the second flow path 186 passes through the outlet tube 106, and thereby out of the muffler 100. The second flow path 186 passes from the inlet tube 104 to the outlet tube 106 without passing through the right chamber 134.

Both flow paths 184, 186 join in the middle chamber 132 where mixing of both portions of the exhaust gas occurs before the exhaust gas flows out of the muffler 100 via the outlet tube 106. Sound waves propagating along both paths meet in the middle chamber 132.

A chamber, such as the left chamber 130, which has the inlet tube 104 being open thereto, is defined herein as an inlet chamber and identified hereinafter by the reference number 130. A chamber, such as the middle chamber 132, which has the outlet tube 106 being open thereto, is defined herein as an outlet chamber and identified hereinafter by the reference number 132. A chamber, such as the right chamber 134, which is bypassed by the second flow path 186, is defined herein as a bypass chamber and identified hereinafter by the reference number 134.

The attenuation of sound waves in the muffler 100 will now be described with reference to FIGS. 5 and 9.

In the illustrated implementation of FIG. 5, the bypass chamber 134 forms a Helmholtz resonator in combination with the tube 170 and the portion of the tube 160 disposed downstream of the perforated portion 166.

The flow paths 184, 186 are configured such that, for sound waves corresponding to a first resonant attenuation frequency, the sound waves of the first portion of the exhaust gas flowing along the first flow path 184 are out of phase with the sound waves of the second portion of the exhaust gas flowing along the second flow path 186 when the two portions combine in the middle chamber 132 causing an enhanced attenuation of the sound waves corresponding to the first resonant attenuation frequency. The sound waves of the first and second flow paths 184, 186 could be out of phase by 180°, 540°, or any other odd multiple of 180°, or by another value that is not an even multiple of 180°.

The flow paths 184, 186 also define a plurality of first anti-resonant frequencies for attenuation of sound waves. These first anti-resonant frequencies would correspond to the frequencies for which the phase difference between the first and second flow paths 184, 186 is an even multiple of 180°.

In the illustrated implementation, the semi-closed tube 150 is configured to attenuate sound waves corresponding to a second resonant attenuation frequency. The semi-closed tube 150 serves as a resonator producing standing waves for certain frequencies. The semi-closed tube 150 will thereby attenuate sound waves in the left chamber 130 for which the length of the tube 150 corresponds to a quarter-wavelength or an odd multiple of the quarter wavelength of the sound wave.

In the illustrated implementation, the semi-closed tube 150 is configured such that the second resonant attenuation frequency corresponds to one of the plurality of first anti-resonance frequencies defined by the first and second flow paths 184, 186. The anti-resonance frequencies would be, for example, frequencies for which the sound waves of the first and second flow paths 184, 186 have a phase difference of 360°, 720°, or any other even multiple of 180°, or by another value that is not an odd multiple of 180°. It is however contemplated that the second resonant attenuation frequency does not correspond to one of the plurality of first anti-resonance frequencies defined by the first and second flow paths 184, 186.

Figure 9:
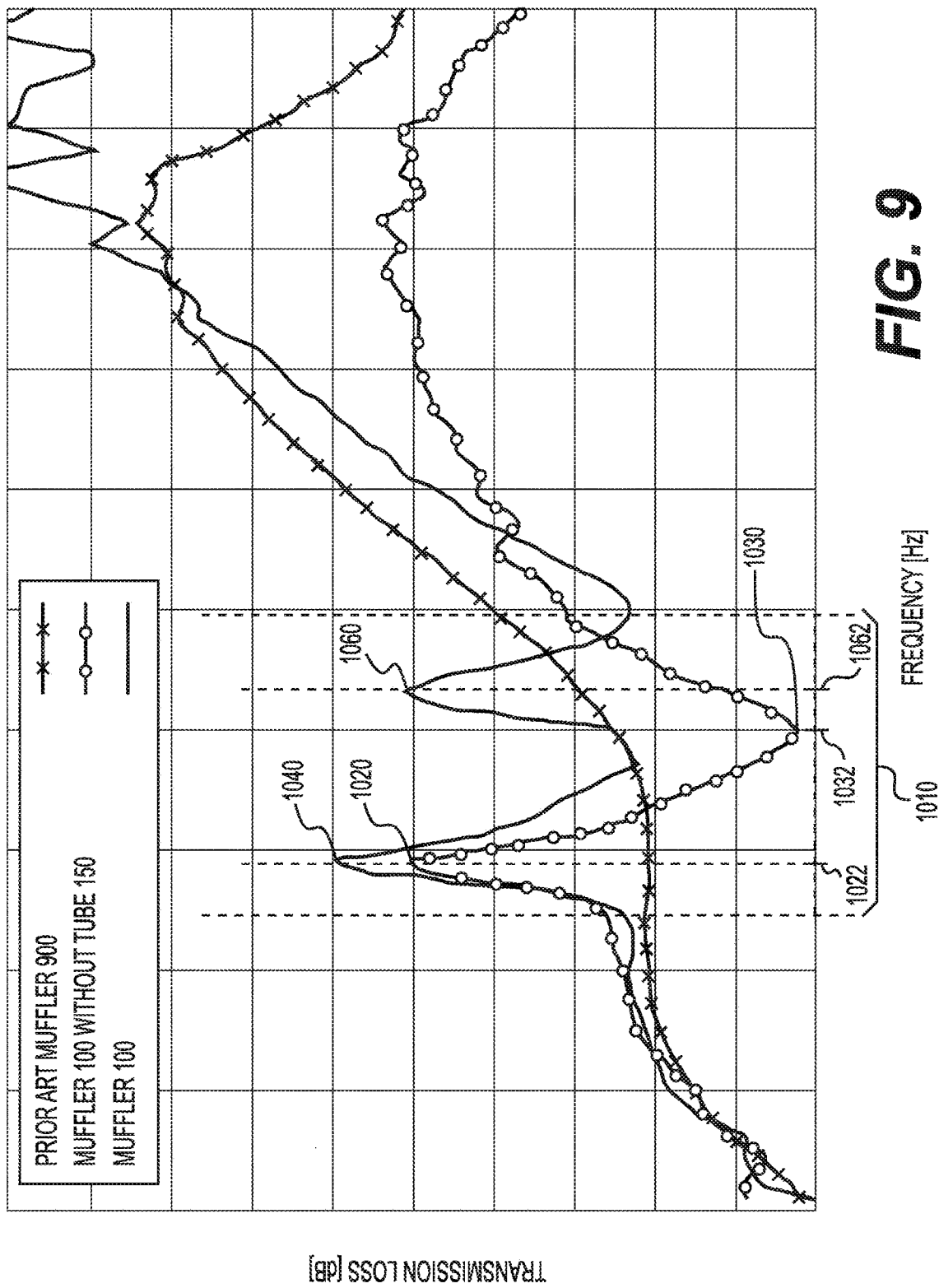
FIG. 9 is a graphical illustration of the attenuation of sound waves by the muffler of FIG. 3A, the muffler of FIG. 3A without the semi-closed tube thereof, and the prior art muffler of FIG. 1.

FIG. 9 shows a plot of attenuation as a function of frequency for the muffler 100 of FIGS. 2 to 5 (solid blue line). FIG. 9 also shows a plot of the attenuation as a function of frequency for a muffler similar to the muffler 100 described above but without the semi-closed tube 150 being provided therein (solid red line interpolated by solid circles). In addition, FIG. 9 also shows a plot of the attenuation as a function of frequency for a two-chamber muffler similar to the prior art muffler 900 of FIG. 1 (solid green line interpolated by crosses).

In FIG. 9, the frequency range 1010 between the dashed lines is indicative of the range in which attenuation of engine noise is desired. It should however be understood, that different engines would output engine noise having a different characteristic than as shown herein, and therefore, the desired frequency range 1010 for attenuation of engine noise could be different from that shown herein.

For the two-chamber prior art muffler 900 (FIG. 1), in this desired frequency range 1010, the attenuation of sound waves remains generally constant or increases with frequency.

For the muffler which is similar to the muffler 100 described above except for the omission of the semi-closed tube 150, in the desired frequency range 1010, the attenuation of sound waves has a peak 1020 at a first frequency 1022 and a trough 1030 at a second frequency 1032 greater than the first frequency 1022. Around the first frequency 1022, the attenuation of sound waves by the muffler 100 without the semi-closed tube 150 is significantly greater than the attenuation of sound waves by the two-chamber prior art muffler 900. Around the second frequency 1032, the attenuation of sound waves by the muffler 100 without the semi-closed tube 150 is significantly lower than the attenuation of sound waves by the two-chamber prior art muffler 900.

For the muffler 100 described above (FIGS. 2 to 5), in the desired frequency range 1010, the attenuation of sound waves has a first peak 1040 at approximately the first frequency 1022 (first resonant attenuation frequency) and a second peak 1060 at a third frequency 1062 (second resonant attenuation frequency). In the illustrated implementation, the third frequency 1062 (second resonant attenuation frequency) is greater than the second frequency 1032 but it is contemplated that the third frequency 1062 could be lower than, or approximately the same as, the second frequency 1032. In the illustrated implementation, around the first peak 1040 and the second peak 1060, the attenuation of sound waves by the muffler 100 is significantly greater than the attenuation of sound waves by the two-chamber prior art muffler 900. Around the second peak 1060, the attenuation of sound waves by the muffler 100 is also significantly greater than the attenuation of sound waves by a muffler similar to the muffler 100 but without the semi-closed tube 150. Around the first peak 1040, the attenuation of sound waves by the muffler 100 is at least as good as the attenuation of sound waves by a muffler similar to the muffler 100 but without the semi-closed tube 150. For most of the desired frequency range 1010, except at the highest frequencies, the attenuation of sound waves by the muffler 100 is at least as great as that achieved with the two-chamber muffler 900 and the three-chamber muffler similar to the muffler 100 but without the semi-closed tube 150. As can be seen, the addition of the semi-closed tube 150 diminishes the effect of the anti-resonance peak 1030, and additionally provides increased attenuation at almost all frequencies in the desired frequency range 1010. The addition of the semi-closed tube 150 has an effect similar to adding a third flow path with less complexity and fewer components than would be required for having a third flow path from the inlet 180 to the outlet 182.

In general, the value of the first resonant attenuation frequency 1022 depends on the dimensions of the right chamber 134, and the dimensions of the tubes 160 and 170. These dimensions can be tuned to achieve the desired value for the first attenuation frequency.

Similarly, the value of the second resonant attenuation frequency 1062 depends on the dimensions of the tube 150, and can be tuned accordingly by varying the dimensions of the tube 150.

In the illustrated implementation, the second resonant attenuation frequency 1062 is greater than the first resonant attenuation frequency 1022. It is also contemplated that the second resonant attenuation frequency 1062 could be lower than the first resonant attenuation frequency 1022.

In the illustrated implementation, the second resonant attenuation frequency 1062 is selected in order to compensate for a particular first anti-resonance frequency 1032 corresponding to the first resonant attenuation frequency 1022, with the particular first anti-resonance frequency 1032 being at a higher frequency than the first resonant attenuation frequency 1022. It is however contemplated that the particular first anti-resonance frequency 1032 being compensated is lower than the first resonant attenuation frequency 1022. It is also contemplated that the second resonant attenuation frequency 1062 is not selected in order to compensate for any particular first anti-resonance frequency.

Figure 6:
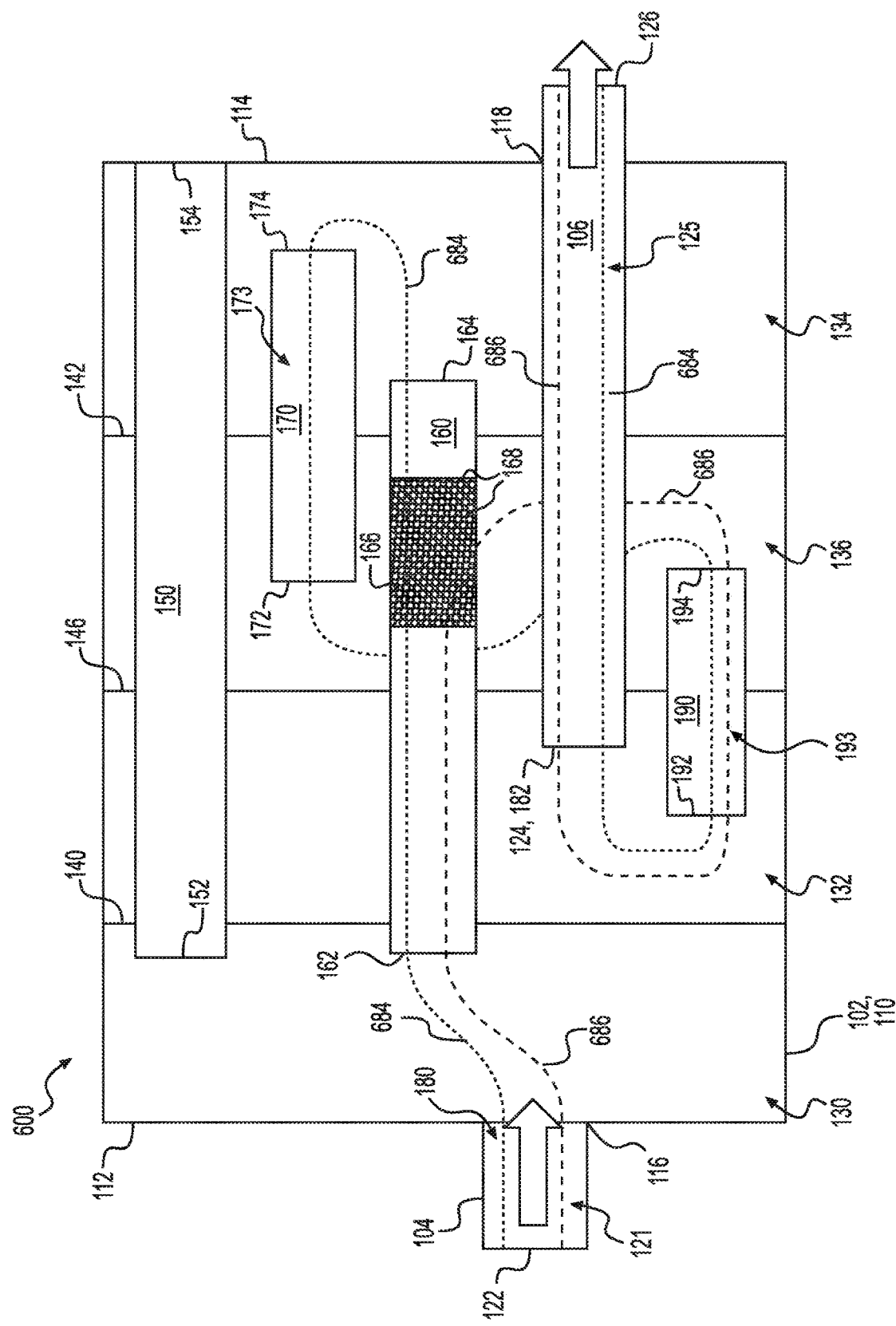
FIG. 6 is a schematic illustration of a muffler according to a second implementation of the present technology showing the flow paths therethrough.

With reference now to FIG. 6, a muffler 600 according to another implementation of the present technology will now be described.

The muffler 600 has many features that correspond to the features of the muffler 100. Corresponding features of the mufflers 100, 600 have been marked with the same reference numbers and will not be described herein in detail except with regard to differences therebetween.

The muffler 600 has four chambers 130, 132, 134, 136 instead of the three chambers 130, 132, 134 in the muffler 100. The inlet chamber 130 having the inlet tube 104 being open thereto is disposed adjacent the left end cap 112 and the outlet chamber 132 having the outlet tube 106 being open thereto is disposed adjacent the inlet chamber 130 as in the muffler 100. The bypass chamber 134 is disposed adjacent the right end cap 114 as in the muffler 100. The fourth chamber 136 is disposed between the outlet chamber 132 and the bypass chamber 134 in the muffler 600. The baffle 142 separates the fourth chamber 136 from the bypass chamber 134, and the fourth chamber 136 is separated from the outlet chamber 132 by a baffle 146.

The tube 160 having the perforated portion 166 extends from the inlet chamber 130 to the bypass chamber 134 at the right end of the housing 102. The perforated portion 166 is disposed in the fourth chamber 136 instead of the outlet chamber 132 as in the muffler 100.

The tube 170 extends from the bypass chamber 134 to the fourth chamber 136 instead of the outlet chamber 132 for fluidly connecting the bypass chamber 134 to the fourth chamber 136.

A tube 190 having two open ends 192, 194 extends between the fourth chamber 136 and the outlet chamber 132 for fluidly connecting the fourth chamber 136 to the outlet chamber 132.

Similarly as in the muffler 100, exhaust gas flows through the muffler 600 from the inlet tube 104 to the outlet tube 106. A first portion of the exhaust gas flows from the inlet tube 104 to the outlet tube 106 along a first flow path 684 and a second portion of the exhaust gas flows from the inlet tube 104 to the outlet tube 106 along a second flow path 686.

The first flow path 684 passes from the inlet tube 104 into the inlet chamber 130, from the inlet chamber 130 into the tube 160 and through the entire length of the passage 163 thereof into the bypass chamber 134. From the bypass chamber 134, the first flow path 684 passes via the tube 170 into the fourth chamber 136, then from the fourth chamber 136 via the tube 190 into the outlet chamber 132 before passing out of the muffler 600 via the outlet tube 106.

The second flow path 686 passes from the inlet tube 104 into the inlet chamber 130, from the inlet chamber 130 into the tube 160 and through a portion of the passage 163 thereof and through the perforations 168 of the perforated portion 166 into the fourth chamber 136 bypassing the bypass chamber 134. The first portion of the exhaust gas mixes with the second portion of the exhaust gas in the fourth chamber 136. From the fourth chamber 136, the second flow path 186 passes via the tube 190 into the outlet chamber 132 before passing out of the muffler 600 via the outlet tube 106. The two portions of the exhaust gas continue to mix in the tube 190 and in the outlet chamber 132. Thus, in this implementation, the mixing of the two portions of the exhaust gas occurs in the outlet chamber 132 as well as the fourth chamber 136.

In the muffler 600, the open end 152 of the semi-closed tube 150 is open to the outlet chamber 132 instead of the inlet chamber 130 as in the muffler 100, and the closed end 154 is disposed abutting the right end cap 114 as in the muffler 100. It is contemplated that either one of the ends 152, 154 of the tube 150 could be disposed in any one of the chambers 130, 132 134, 136. It is also contemplated that the closed end 154 could be disposed outside the housing 102.

It is further contemplated that the perforated portion 166 could be disposed in the outlet chamber 132 as in the muffler 100, instead of the fourth chamber 136 as shown herein. In this case, the first flow path 684 flowing through the perforations 168 would bypass the fourth chamber 136 as well as the bypass chamber 134, and the mixing of the first and second portions of the exhaust gas would occur in the outlet chamber 132 and not in the fourth chamber 136.

Figure 8:
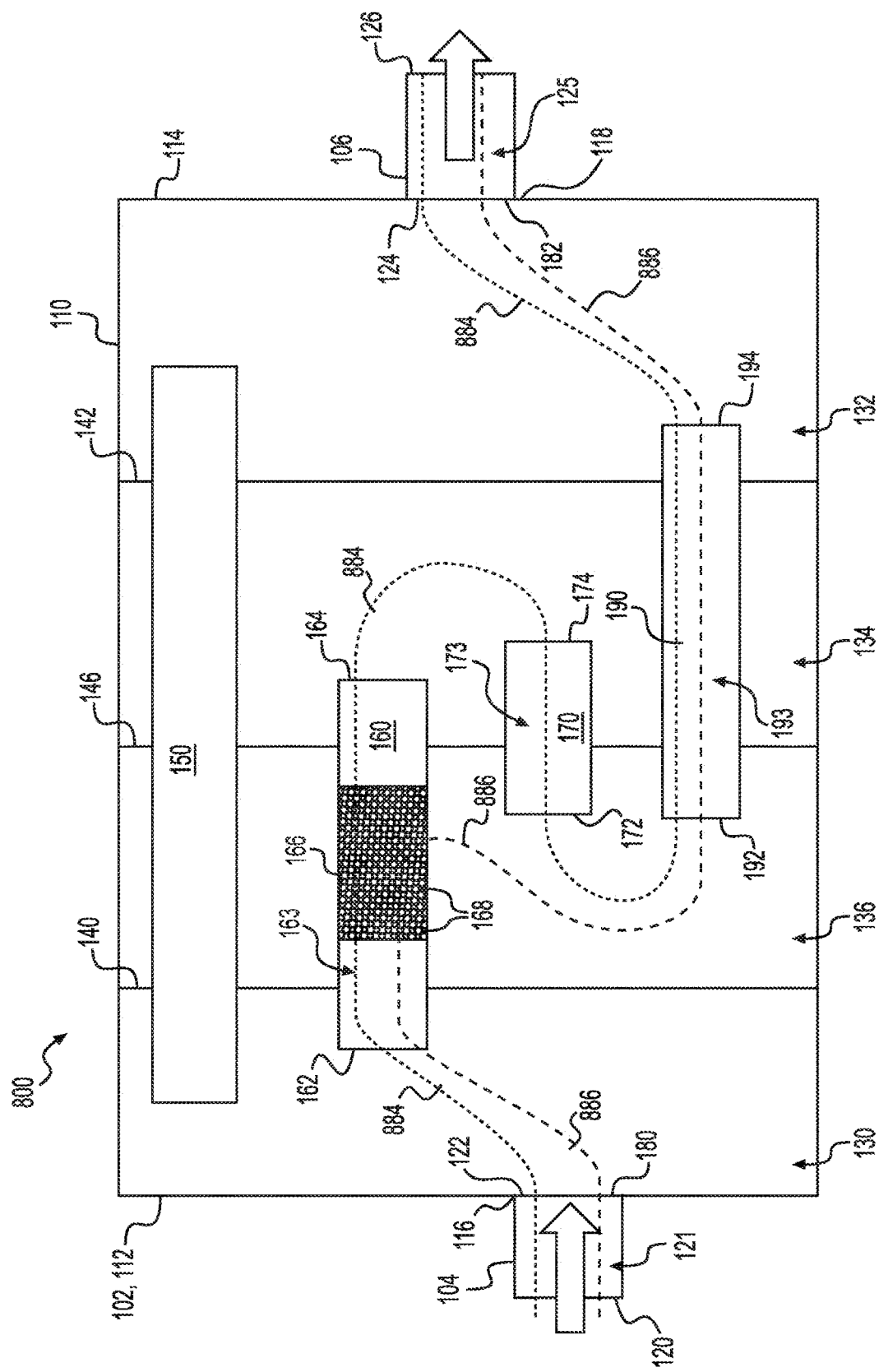
FIG. 8 is a schematic illustration of a muffler according to a fourth implementation of the present technology showing the flow paths therethrough.

With reference to FIG. 8, a muffler 800 according to yet another implementation of the present technology will now be described.

The muffler 800 has many features that correspond to the features of the muffler 600. Corresponding features of the mufflers 600 and 800 have been marked with the same reference numbers and will not be described herein in detail except with regard to the differences therebetween.

As in the muffler 600, the muffler 800 has four chambers 130, 132, 134, 136 defined by the housing 102 and the baffles 140, 142 and 146. In the muffler 800, the inlet tube 104 is connected to the opening 116 of the left end cap 112 and the inlet chamber 130 is disposed adjacent the left end cap 112 as in the muffler 600. In the muffler 800, the left end 124 of the outlet tube 106 is connected to the opening 118 defined in the right end cap 114, instead of extending inside the housing 102 through the opening 118 as in the muffler 600. Thus, in the muffler 800, the outlet chamber 132 having the outlet tube 106 being open thereto is disposed adjacent the right end cap 114.

In the muffler 800, the bypass chamber 134 is disposed adjacent the outlet chamber 132 and not adjacent the right end cap 114 as in the muffler 600. The tube 160 having the perforated portion 166 extends from a left end 162 disposed in the inlet chamber 130 to a right end 164 disposed in the bypass chamber 134 adjacent the outlet chamber 132. The perforated portion 166 is disposed in the fourth chamber 136 which is disposed adjacent the inlet chamber 130.

The tube 170 extends from the bypass chamber 834, 134 to the fourth chamber 136 for fluidly connecting the bypass chamber 134 to the fourth chamber 136.

The tube 190 extends between the fourth chamber 136 and the outlet chamber 132 for fluidly connecting the fourth chamber 136 to the outlet chamber 132.

The semi-closed tube 150 has its left end 152 being closed and disposed in the inlet chamber 130, while the right end 154 is open and disposed in the outlet chamber 132. The closed left end 152 is not abutting against the left end cap 112 but spaced therefrom. It is contemplated that either one of the ends 152, 154 of the tube 150 could be disposed in any one of the chambers 130, 132 134, 136. It is also contemplated that the closed end 152 could be disposed outside the housing 102.

Similarly as in the mufflers 100 and 600, exhaust gas flows through the muffler 800 from the inlet tube 104 to the outlet tube 106. A first portion of the exhaust gas flows from the inlet tube 104 to the outlet tube 106 along a first flow path 884 and a second portion of the exhaust gas flows from the inlet tube 104 to the outlet tube 106 along a second flow path 886.

The first flow path 884 passes from the inlet tube 104 into the inlet chamber 130, from the inlet chamber 130 into the tube 160 and through the entire length of the passage 163 thereof into the bypass chamber 134. From the bypass chamber 134, the first flow path 884 passes via the tube 170 into the fourth chamber 136, then from the fourth chamber 136 via the tube 190 into the outlet chamber 132 before passing out of the muffler 800 via the outlet tube 106.

The second flow path 886 passes from the inlet tube 104 into the inlet chamber 130, from the inlet chamber 130 into the tube 160 and through a portion of the passage 163 thereof and through the perforations 168 of the perforated portion 166 into the fourth chamber 136 bypassing the bypass chamber 134. The first portion of the exhaust gas mixes with the second portion of the exhaust gas in the fourth chamber 136. From the fourth chamber 136, the second flow path 886 passes via the tube 190 into the outlet chamber 132 before passing out of the muffler 800 via the outlet tube 106. The two portions of the exhaust gas continue to mix in the tube 190 and in the outlet chamber 132. Thus, in this implementation of the muffler 800, the mixing of the two portions of the exhaust gas occurs in the outlet chamber 132 as well as the fourth chamber 136 as in the muffler 600.

Figure 7:
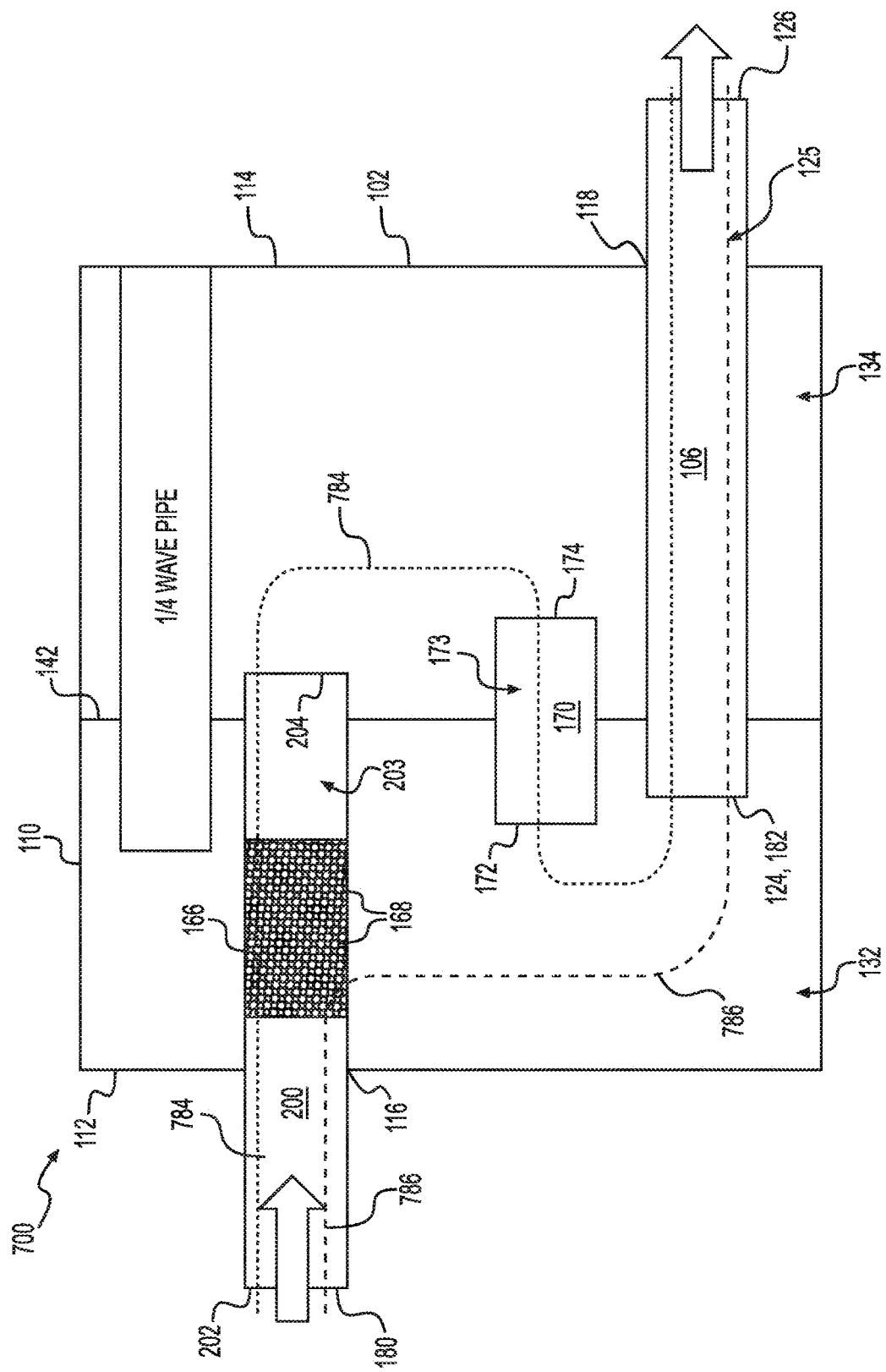
FIG. 7 is a schematic illustration of a muffler according to a third implementation of the present technology showing the flow paths therethrough.

With reference now to FIG. 7, a muffler 700 according to another implementation of the present technology will now be described.

The muffler 700 has many features that correspond to the features of the muffler 100. Corresponding features of the mufflers 100, 700 have been marked with the same reference numbers and will not be described again herein in detail except with regard to the differences therebetween.

The inlet tube 104 and the tube 160 of the muffler 100 have been integrated into a single tube 200 in the muffler 700. The inlet chamber 130 of the muffler 100 where the inlet tube 104 opens into has been omitted from the muffler 700. Thus, the muffler 700 has two chambers 132, 134 instead of the three chambers 130, 132, 134 in the muffler 100. The left baffle 140 of the muffler 100 has been omitted in the muffler 700, and the outlet chamber 132 having the outlet tube 106 being open thereto is disposed adjacent the left end cap 112 in the muffler 700.

The tube 200 has a left end 202 disposed outside the housing 102 and a right end 204 disposed inside the right chamber 134 (bypass chamber 134). The tube 202 extends from the left end 202 through the opening 116 of the left end cap 112 and through the outlet chamber 132 into the bypass chamber 134. The tube 200 defines a passage 203 extending from outside the housing 102 to the bypass chamber 134. The tube 202 has a perforated portion 166 having a plurality of perforations 168 and is disposed in outlet chamber 132. It is contemplated that the tube 200 could not extend through the opening 116 of the left end cap 112. For example, the left end of the tube 200 could be connected around the opening 116 of the left end cap 112.

The outlet tube 106 extends from its left end 124 disposed in the outlet chamber 132 through the bypass chamber 134 and the opening 118 in the right end cap 114 to the right end 126 disposed outside the housing 102 similar to the outlet tube 106 of the muffler 100.

The tube 170 extends between the outlet chamber 132 and the bypass chamber 134 for fluidly connecting the outlet chamber 132 with the bypass chamber 134.

Exhaust gas is introduced into the muffler 700 through the left end 202 of the tube 200. A first portion of the exhaust gas then flows to the outlet tube 106 along a first flow path 784 and a second portion of the exhaust gas flows to the outlet tube 106 along a second flow path 786.

The first flow path 784 passes from the left end 202 of the tube 200 through the entire length of the passage 203 and out of the right end 204 thereof into the bypass chamber 134. From the bypass chamber 134, the first flow path 784 passes via the tube 170 into the outlet chamber 132, and then from the outlet chamber 132 into the outlet tube 106 and thereby out of the muffler 700.

The second flow path 786 passes from left end 202 of the tube 200 through a portion of the passage 203 and through the perforations 168 into the outlet chamber 132. From the outlet chamber 132, the second flow path 186 passes into the outlet tube 106 and thereby out of the muffler 700. The second flow path 786 thus bypasses the bypass chamber 134.

The first and second flow paths 784, 786 join in the outlet chamber 132 where the first and second portions of the exhaust gas mix before passing out of the muffler 700 through the outlet tube 106.

In general, a muffler 100, 600, 700, 800 according to the present technology has at least two chambers 132, 134 and a semi-closed tube 150 being open to one of the chambers 132, 134. The chambers are interconnected by passages which define at least two different flow paths 184 and 186, 684 and 686, 784 and 786, 884 and 886, through the muffler 100, 600, 700, 800. An inlet 180 can be defined for each muffler 100, 600, 700, 800 through which all the exhaust gas passes before separating into a first portion flowing along a first flow path 184, 684, 784, 884 and a second portion flowing along a second flow path 186, 686, 786, 886. An outlet 182 can also be defined for each muffler 100, 600, 700, 800 through which all the exhaust gas flows out of the muffler 100, 600, 700, 800 after separating into the first portion flowing along a first flow path 184, 684, 784, 884 and a second portion flowing along a second flow path 186, 686, 786, 886, and after subsequent rejoining of the first flow path 184, 684, 784, 884 with the second flow path 186, 686, 786, 886.

Thus, in the muffler 100 of FIGS. 3A to 5, in the muffler 600 of FIG. 6 and the muffler 800 of FIG. 8, the inlet tube 104 serves as the inlet 180. If the inlet tube 104 were omitted in the muffler 100 or 600, the opening 116 of the left end cap 112 could serve as the inlet 180. In these mufflers 100, 600, 800, the inlet 180 is open to the inlet chamber 130.

In the muffler 700 of FIG. 7, the left end 202 of the tube 200 serves as an inlet 180 for the muffler 700 as the exhaust gas separates into the first portion flowing along the first flow path 784 and a second portion flowing along a second flow path 786 before exiting the tube 200 via the right end 204 thereof. In the muffler 700, the inlet 180 is disposed outside the housing 102.

In the muffler 100 of FIGS. 3A to 5, in the muffler 600 of FIG. 6, the muffler 800 of FIG. 8 and in the muffler 700 of FIG. 7, the outlet tube 106 serves as an outlet 182 through which exhaust gas is discharged from the muffler 100, 600, 700, 800. The outlet 182 is open to the outlet chamber 132. In the muffler 800 of FIG. 8, if the outlet tube 106 were omitted, the opening 118 of the right end cap 114 could serve as the outlet 182.

Mufflers 100, 600, 700, 800 achieve a large attenuation of engine noise without an accompanying large increase in backpressure and/or complexity of the components. Mufflers 100, 600, 700, 800 are also light in weight and compact in size.

The muffler implemented in accordance with some non-limiting implementations of the present technology can be represented as presented in the following numbered clauses.

CLAUSE 1. A muffler for an internal combustion engine, the muffler comprising: a housing enclosing a plurality of chambers including an outlet chamber and a bypass chamber; an inlet for receiving exhaust gas from the engine; an outlet for discharging exhaust gas from the muffler, the outlet opening to the outlet chamber; at least the inlet, the outlet, the outlet chamber, and the bypass chamber defining a first flow path extending from the inlet to the outlet and passing through the bypass chamber; a flow tube defining a passage upstream of the bypass chamber, the first flow path being defined at least in part by the flow tube; and a plurality of perforations defined in a portion of the flow tube, each of the plurality of perforations being open to one of the plurality of chambers other than the bypass chamber; at least the inlet, the outlet, the outlet chamber, and the plurality of perforations defining a second flow path extending from the inlet to the outlet without passing through the bypass chamber, the second flow path passing through the plurality of perforations, whereby exhaust gas is introduced into the muffler via the inlet and discharged from the muffler via the outlet; a first portion of the exhaust gas flows from the inlet to the outlet along the first flow path and a second portion of the exhaust gas flows from the inlet to the outlet along the second flow path, the first portion mixing with the second portion at least in the outlet chamber; and a semi-closed tube having an open end and a closed end opposite the open end, the open end of the semi-closed tube being open to one of the a plurality of chambers.

CLAUSE 2. The muffler of clause 1, wherein: the plurality of chambers is at least three chambers including an inlet chamber, the outlet chamber and the bypass chamber; the inlet opens into the inlet chamber; each perforation of the plurality of perforations is open to one of the at least three chambers other than the inlet chamber and the bypass chamber.

CLAUSE 3. The muffler of clause 2, wherein the inlet is defined by an inlet tube extending from a first end being open to the inlet chamber to a second end being open outside the muffler.

CLAUSE 4. The muffler of clause 2 or 3, wherein the flow tube comprises: a first end open to the inlet chamber; and a second end opposite the first end being open to one of the at least three chambers other than the outlet chamber and the inlet chamber.

CLAUSE 5. The muffler of clause 4, wherein the second end of the flow tube is open to the bypass chamber, the flow tube fluidly communicating the inlet chamber with the bypass chamber.

CLAUSE 6. The muffler of any one of clauses 2 to 5, wherein the plurality of perforations is open to the outlet chamber.

CLAUSE 7. The muffler of clause 6, wherein: the at least three chambers is three chambers; the flow tube is a first flow tube fluidly communicating the inlet chamber with the bypass chamber; the passage defined by the first flow tube is a first passage; the muffler further comprises a second passage fluidly connecting the bypass chamber with the outlet chamber, the first flow path passing from the inlet to the inlet chamber, from the inlet chamber via the first passage to the bypass chamber, from the bypass chamber via the second passage to the outlet chamber and from the outlet chamber out of the muffler via the outlet; the second flow path passing from the inlet to the inlet chamber, from the inlet chamber via a portion of the first passage and through the plurality of perforations into the outlet chamber and from the outlet chamber out of the muffler via the outlet.

CLAUSE 8. The muffler of clause 7, further comprising a second flow tube fluidly connecting the bypass chamber to the outlet chamber and defining the second passage.

CLAUSE 9. The muffler of any one of clauses 2 to 8, wherein: the bypass chamber is disposed adjacent a first end of the housing; the inlet chamber is disposed adjacent a second end of the housing opposite the first end of the housing; and the outlet chamber is disposed between the inlet chamber and the bypass chamber.

CLAUSE 10. The muffler of any one of clauses 2 to 5 and 9, wherein the at least three chambers is four chambers including the inlet chamber, the outlet chamber, the bypass chamber and a fourth chamber.

CLAUSE 11. The muffler of clause 10, wherein the plurality of perforations is open to the fourth chamber.

CLAUSE 12. The muffler of any one of clauses 1 to 8, wherein the bypass chamber is disposed adjacent a first end of the housing.

CLAUSE 13. The muffler of any one of clauses 2 to 12, wherein the open end of the semi-closed tube is open to the inlet chamber.

CLAUSE 14. The muffler of clause 1, wherein: the flow tube extends from the inlet to one of the plurality of chambers other than the outlet chamber.

CLAUSE 15. The muffler of clause 14, wherein the plurality of perforations is open to the outlet chamber.

CLAUSE 16. The muffler of any one of clauses 1 to 15, further comprising an outlet tube extending from a first end being open to the outlet chamber to a second end being open outside the muffler, the outlet being defined by the outlet tube.

CLAUSE 17. The muffler of clause 16, wherein the outlet tube further comprises a spark arrestor.

CLAUSE 18. The muffler of any one of clauses 1 to 17, wherein: the first flow path and the second flow path join at least in the outlet chamber and are configured to provide a first resonant attenuation frequency for attenuation of sound waves, and the semi-closed tube is configured to provide a second resonant attenuation frequency for attenuation of sound waves.

CLAUSE 19. The muffler of clause 18, wherein the second resonant attenuation frequency is greater than the first resonant attenuation frequency.

CLAUSE 20. The muffler or clause 18 or 19, wherein the second resonant attenuation frequency is an anti-resonant frequency with respect to the first resonant attenuation frequency.

CLAUSE 21. A powerpack comprising: an internal combustion engine having at least one exhaust port; and a muffler according to any one of clauses 1 to 20, the inlet of the muffler being fluidly connected to the at least one exhaust port to receive exhaust gas therefrom.

CLAUSE 22. A vehicle comprising: the powerpack of clause 21.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A muffler for an internal combustion engine, the muffler comprising:
   a housing enclosing a plurality of chambers including an outlet chamber and a bypass chamber;

an inlet for receiving exhaust gas from the engine;
an outlet for discharging exhaust gas from the muffler, the outlet opening to the outlet chamber;
at least the inlet, the outlet, the outlet chamber, and the bypass chamber defining a first flow path extending from the inlet to the outlet and passing through the bypass chamber;
a flow tube defining at least in part the first flow path, the flow tube defining a passage upstream of the bypass chamber along the first flow path; and
a plurality of perforations defined in a portion of the flow tube, each of the plurality of perforations being open to one of the plurality of chambers other than the bypass chamber;
at least the inlet, the outlet, the outlet chamber, and the plurality of perforations defining a second flow path extending from the inlet to the outlet without passing through the bypass chamber, the second flow path passing through the plurality of perforations,
whereby
exhaust gas is introduced into the muffler via the inlet and discharged from the muffler via the outlet;
a first portion of the exhaust gas flows from the inlet to the outlet along the first flow path and a second portion of the exhaust gas flows from the inlet to the outlet along the second flow path, the first portion mixing with the second portion at least in the outlet chamber; and
a semi-closed tube having an open end and a closed end opposite the open end, the open end of the semi-closed tube being open to one of the plurality of chambers.

2. The muffler of claim 1, wherein:
the plurality of chambers is at least three chambers including an inlet chamber, the outlet chamber and the bypass chamber;
the inlet opens into the inlet chamber;
each perforation of the plurality of perforations is open to one of the at least three chambers other than the inlet chamber and the bypass chamber.

3. The muffler of claim 2, wherein the inlet is defined by an inlet tube extending from a first end being open to the inlet chamber to a second end being open outside the muffler.

4. The muffler of claim 2, wherein the flow tube comprises:
a first end open to the inlet chamber; and
a second end opposite the first end being open to one of the at least three chambers other than the outlet chamber and the inlet chamber.

5. The muffler of claim 4, wherein the second end of the flow tube is open to the bypass chamber, the flow tube fluidly communicating the inlet chamber with the bypass chamber.

6. The muffler of claim 2, wherein the plurality of perforations is open to the outlet chamber.

7. The muffler of claim 6, wherein:
the at least three chambers is three chambers;
the flow tube is a first flow tube fluidly communicating the inlet chamber with the bypass chamber;
the passage defined by the first flow tube is a first passage;
the muffler further comprises a second passage fluidly connecting the bypass chamber with the outlet chamber,
the first flow path passing from the inlet to the inlet chamber, from the inlet chamber via the first passage to the bypass chamber, from the bypass chamber via the second passage to the outlet chamber and from the outlet chamber out of the muffler via the outlet;
the second flow path passing from the inlet to the inlet chamber, from the inlet chamber via a portion of the first passage and through the plurality of perforations into the outlet chamber and from the outlet chamber out of the muffler via the outlet.

8. The muffler of claim 7, further comprising a second flow tube fluidly connecting the bypass chamber to the outlet chamber and defining the second passage.

9. The muffler of claim 2, wherein:
the bypass chamber is disposed adjacent a first end of the housing;
the inlet chamber is disposed adjacent a second end of the housing opposite the first end of the housing; and
the outlet chamber is disposed between the inlet chamber and the bypass chamber.

10. The muffler of claim 2, wherein the at least three chambers is four chambers including the inlet chamber, the outlet chamber, the bypass chamber and a fourth chamber.

11. The muffler of claim 10, wherein the plurality of perforations is open to the fourth chamber.

12. The muffler of claim 1, wherein the bypass chamber is disposed adjacent a first end of the housing.

13. The muffler of claim 2, wherein the open end of the semi-closed tube is open to the inlet chamber.

14. The muffler of claim 1, wherein:
the flow tube extends from the inlet to one of the plurality of chambers other than the outlet chamber.

15. The muffler of claim 14, wherein the plurality of perforations is open to the outlet chamber.

16. The muffler of claim 1, further comprising an outlet tube extending from a first end being open to the outlet chamber to a second end being open outside the muffler, the outlet being defined by the outlet tube.

17. The muffler of claim 16, wherein the outlet tube further comprises a spark arrestor.

18. The muffler of claim 1, wherein:
the first flow path and the second flow path join at least in the outlet chamber and are configured to provide a first resonant attenuation frequency for attenuation of sound waves, and
the semi-closed tube is configured to provide a second resonant attenuation frequency for attenuation of sound waves.

19. The muffler of claim 18, wherein the second resonant attenuation frequency is greater than the first resonant attenuation frequency.

20. The muffler of claim 18, wherein the second resonant attenuation frequency is an anti-resonant frequency with respect to the first resonant attenuation frequency.

* * * * *